US012801049B2

(12) United States Patent
Ishizuka et al.

(10) Patent No.: US 12,801,049 B2
(45) Date of Patent: Nov. 17, 2026

(54) ELECTROSTATIC IMAGE DEVELOPING TONER, ELECTROSTATIC IMAGE DEVELOPER, TONER CARTRIDGE, PROCESS CARTRIDGE, AND IMAGE FORMING APPARATUS

(71) Applicant: FUJIFILM BUSINESS INNOVATION CORP., Tokyo (JP)

(72) Inventors: Daisuke Ishizuka, Kanagawa (JP); Tsutomu Furuta, Kanagawa (JP); Erina Saito, Kanagawa (JP); Tomohito Nakajima, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 543 days.

(21) Appl. No.: 18/457,876

(22) Filed: Aug. 29, 2023

(65) Prior Publication Data

US 2024/0319626 A1 Sep. 26, 2024

(30) Foreign Application Priority Data

Mar. 24, 2023 (JP) ................................. 2023-048935

(51) Int. Cl.
*G03G 9/087* (2006.01)

(52) U.S. Cl.
CPC ..... *G03G 9/08797* (2013.01); *G03G 9/08755* (2013.01); *G03G 9/08795* (2013.01)

(58) Field of Classification Search
CPC ........... G03G 9/08797; G03G 9/08755; G03G 9/08795
See application file for complete search history.

(56) References Cited

U.S. PATENT DOCUMENTS

| | | | | |
|---|---|---|---|---|
| 6,329,115 | B1 | 12/2001 | Yamashita | |
| 2008/0182186 | A1 | 7/2008 | Usami et al. | |
| 2009/0269691 | A1* | 10/2009 | Yamato | G03G 9/08791 430/108.4 |
| 2011/0281211 | A1 | 11/2011 | Konno et al. | |
| 2013/0216944 | A1 | 8/2013 | Shiba et al. | |
| 2016/0026104 | A1* | 1/2016 | Fujita | G03G 9/09733 430/108.7 |
| 2017/0227874 | A1 | 8/2017 | Eri et al. | |
| 2018/0004106 | A1* | 1/2018 | Matsui | G03G 9/08711 |

FOREIGN PATENT DOCUMENTS

| | | | |
|---|---|---|---|
| JP | H08-062884 | A | 3/1996 |
| JP | 2000275907 | A * | 10/2000 |
| JP | 4068191 | B2 | 3/2008 |
| JP | 2008-257056 | A | 10/2008 |
| JP | 2011-257744 | A | 12/2011 |

OTHER PUBLICATIONS

English machine translation of the description of JP-2000275907-A (Year: 2000).*
Mar. 1, 2024 extended Search Report issued in European Patent Application No. 23195040.3.

* cited by examiner

*Primary Examiner* — Boone Alexander Evans
(74) *Attorney, Agent, or Firm* — Oliff PLC

(57) ABSTRACT

An electrostatic image developing toner includes a binder resin and crosslinked resin particles. In a cross section of the electrostatic image developing toner, the area fraction Sc of the crosslinked resin particles is 5% or more and 40% or less, the proportion Se of voids in the cross section is 1% or more and 10% or less, and the ratio Se/Sc of the proportion Se of voids to the area fraction Sc is 0.05 or more and 1.5 or less.

18 Claims, 2 Drawing Sheets

ELECTROSTATIC IMAGE DEVELOPING TONER, ELECTROSTATIC IMAGE DEVELOPER, TONER CARTRIDGE, PROCESS CARTRIDGE, AND IMAGE FORMING APPARATUS

CROSS-REFERENCE TO RELATED APPLICATIONS

This application is based on and claims priority under 35 USC 119 from Japanese Patent Application No. 2023-048935 filed Mar. 24, 2023.

BACKGROUND

(i) Technical Field

The present disclosure relates to an electrostatic image developing toner, an electrostatic image developer, a toner cartridge, a process cartridge, and an image forming apparatus.

(ii) Related Art

Japanese Laid Open Patent Application Publication No. 2011-257744 discloses an electrostatic image developing toner including toner particles that include a binder resin having a domain-matrix structure and a colorant, wherein the median diameter of the toner particles is 4.3 to 7.0 μm on a volume basis, the matrix phase of the binder resin is composed of a polymer of a styrene-acrylic resin or polyester resin, the domain phase of the binder resin is composed of a polymer including a structural unit derived from a diene monomer, the Feret's diameter of the domain phase is 50 to 300 nm, and the glass transition temperature of the polymer constituting the domain phase is −85 to +35° C.

Japanese Laid Open Patent Application Publication No. 2008-257056 includes an electrophotographic toner produced by aggregation and coalescence of particles including a binder resin including polyester in an aqueous medium under the presence of a monovalent salt, wherein the volume median diameter D50 of the toner is 2 to 7 μm, and the ratio of the total area of pores to the area of toner particles which is measured in a cross section of the toner particles (total pore area/particle area) is 1.0% to 6%.

SUMMARY

A technique in which resin particles having a low glass transition temperature are added to a toner in order to enhance the fixability of the toner is known. However, in the case where fixed images formed using such a toner are stored while being stacked on top of one another at high temperatures, the glossiness of the images may be increased. Therefore, it has been difficult to achieve both low temperature fixability and stability of image gloss during high temperature storage.

Aspects of non-limiting embodiments of the present disclosure relate to an electrostatic image developing toner that has both low temperature fixability and stability of image gloss during high temperature storage, compared with a toner including crosslinked resin particles, wherein the proportion of voids in the toner is less than 1% or more than 10%.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an electrostatic image developing toner including a binder resin and crosslinked resin particles, wherein, in a cross section of the electrostatic image developing toner, an area fraction Sc of the crosslinked resin particles is 5% or more and 40% or less, a proportion Se of voids in the cross section is 1% or more and 10% or less, and a ratio Se/Sc of the proportion Se of voids to the area fraction Sc is 0.05 or more and 1.5 or less.

BRIEF DESCRIPTION OF THE DRAWINGS

Exemplary embodiments of the present disclosure will be described in detail based on the following figures, wherein.

DETAILED DESCRIPTION

Figure 1:
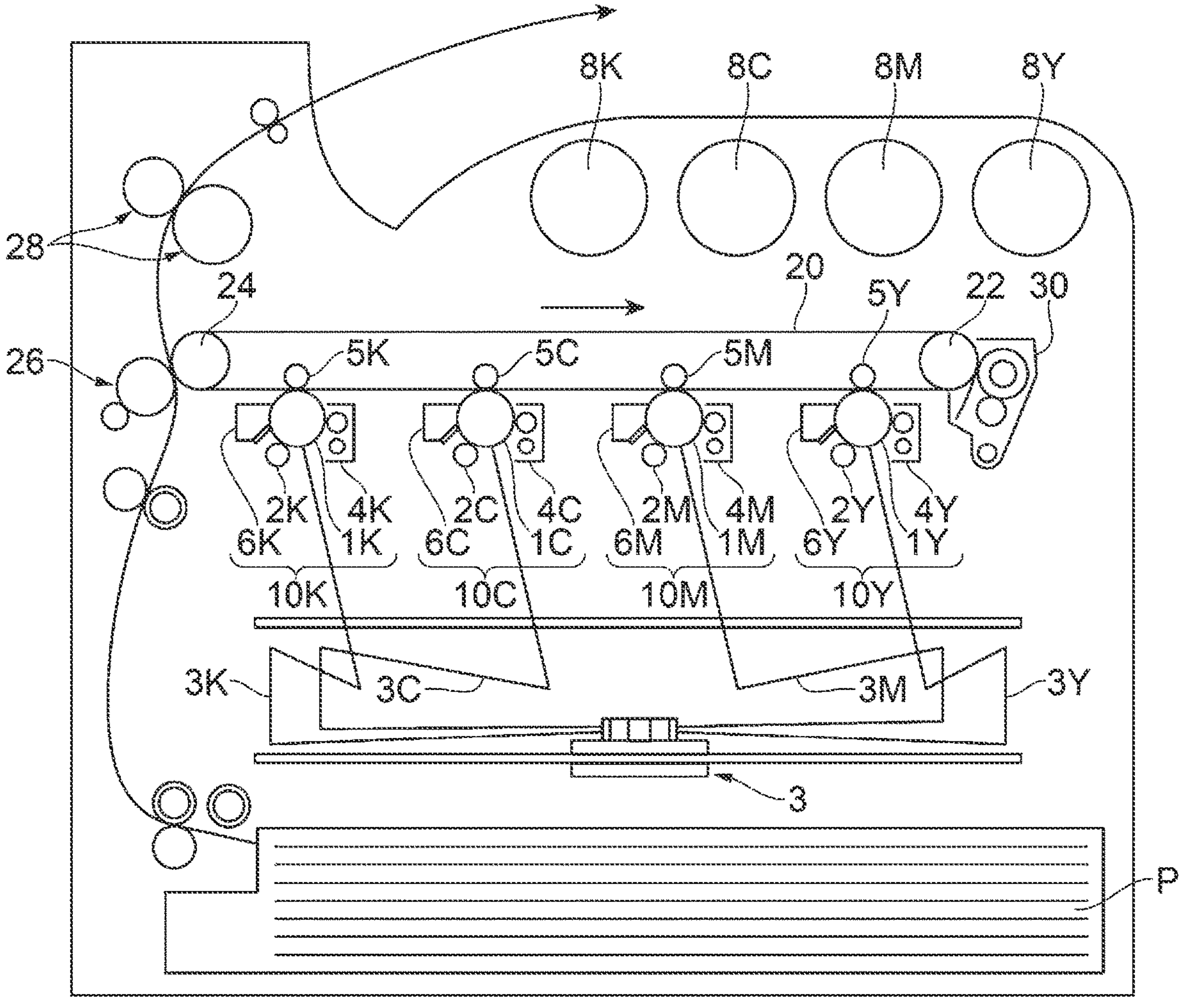
FIG. 1 is a schematic diagram illustrating an example of an image forming apparatus according to an exemplary embodiment.

Exemplary embodiments of the present disclosure are described below. It should be noted that the following description, Examples, etc. are intended to be illustrative of the exemplary embodiments but not restrictive of the scope of the present disclosure.

In the present disclosure, the expressions "X or more and Y or less" and "X to Y" used for describing a numerical range mean the numerical range that includes the lower and upper limits unless otherwise specified. In the present disclosure, in the case where a composition includes a plurality of types of substances that correspond to a component of the composition, the content of the component in the composition is the total content of the substances in the composition unless otherwise specified.

In the present disclosure, "electrostatic image developing toner" may be referred to simply as "toner", "electrostatic image developing carrier" may be referred to simply as "carrier", and "electrostatic image developer" may be referred to simply as "developer".

In the present disclosure, the term "(meth)acryl" refers to both "acryl" and "methacryl".

Electrostatic Image Developing Toner

The electrostatic image developing toner according to this exemplary embodiment is an electrostatic image developing toner including a binder resin and crosslinked resin particles. In a cross section of the electrostatic image developing toner, an area fraction Sc of the crosslinked resin particles is 5% or more and 40% or less, a proportion Se of voids in the cross section is 1% or more and 10% or less, and a ratio Se/Sc of the proportion Se of voids to the area fraction Sc is 0.01 or more and 0.5 or less.

A toner that include crosslinked resin particles having a low glass transition temperature and rubber elasticity is disclosed. When such a toner is used, the crosslinked resin particles may be exposed at the surfaces of images as a result of the toner particles being deformed by heating during fixation. If images including the particles exposed at the surfaces are stacked on top of one another at high temperatures, although the crosslinked resin particles, which have a low glass transition temperature, do not become deformed during fixation, the crosslinked resin particles become smoothened when exposed to high pressures over a prolonged period of time subsequent to the formation of images. This results in an increase in the glossiness of the images.

In contrast, since the toner according to the exemplary embodiment has the above-described structure, both low temperature fixability and stability of image gloss during high temperature storage may be achieved. The mechanisms are presumably as follows.

In the case where a toner has the structure described in the exemplary embodiment, since appropriate voids are formed inside toner particles, the conduction of heat toward the centers of the toner particles is reduced. Consequently, an increase in the temperature of the inside of the toner particles is limited compared with the surfaces of the toner particles. As a result, the likelihood of the crosslinked resin particles being exposed at the surfaces during fixation may be reduced.

Furthermore, since the voids are present, during fixation, the crosslinked resin particles are likely to extend in the voids, rather than being exposed outside the toner particles. This also reduces the likelihood of the particles being exposed at the toner surfaces. For the above reasons, it is considered that a change in image gloss may be limited even when the images are stacked on top of one another.

It is considered that the structure of the toner according to the exemplary embodiment enables both low temperature fixability and stability of image gloss during high temperature storage to be achieved by the above-described mechanisms.

Details of the electrostatic image developing toner according to this exemplary embodiment are described below.

The electrostatic image developing toner according to this exemplary embodiment includes a binder resin and crosslinked resin particles. The toner particles include, for example, a binder resin, crosslinked resin particles, and, as needed, a colorant, a release agent, and other additives.

Binder Resin

Examples of the binder resin include vinyl resins that are homopolymers of the following monomers or copolymers of two or more monomers selected from the following monomers: styrenes, such as styrene, para-chlorostyrene, and α-methylstyrene; (meth)acrylates, such as methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate; ethylenically unsaturated nitriles, such as acrylonitrile and methacrylonitrile; vinyl ethers, such as vinyl methyl ether and vinyl isobutyl ether; vinyl ketones, such as vinyl methyl ketone, vinyl ethyl ketone, and vinyl isopropenyl ketone; and olefins, such as ethylene, propylene, and butadiene.

Examples of the binder resin further include non-vinyl resins, such as epoxy resins, polyester resins, polyurethane resins, polyamide resins, cellulose resins, polyether resins, and modified rosins; a mixture of the non-vinyl resin and the vinyl resin; and a graft polymer produced by polymerization of the vinyl monomer in the presence of the non-vinyl resin.

The above binder resins may be used alone or in combination of two or more.

The binder resin preferably includes a polyester resin.

In the case where the binder resin includes a polyester resin, when a styrene-(meth)acrylate copolymer is used as crosslinked resin particles as described below, the likelihood of aggregation of the crosslinked resin particles may be increased and the proportion of the voids may be adjusted to fall within an adequate range.

The binder resin may include an amorphous resin and a crystalline resin.

The term "amorphous resin" used herein refers to a resin that does not exhibit a distinct endothermic peak but only a step-like endothermic change in thermal analysis conducted using differential scanning calorimetry (DSC), that is solid at normal temperature, and that undergoes heat plasticization at a temperature equal to or higher than the glass transition temperature.

The term "crystalline resin" used herein refers to a resin that exhibits a distinct endothermic peak instead of a step-like endothermic change in DSC, that is, for example, a resin that exhibits an endothermic peak with a half-width of 10° C. or less at a heating rate of 10° C./min.

The amorphous resin is described below.

Examples of the amorphous resin include the amorphous resins known in the related art, such as an amorphous polyester resin, an amorphous vinyl resin (e.g., a styrene acrylic resin), an epoxy resin, a polycarbonate resin, and a polyurethane resin. Among the above amorphous resins, an amorphous polyester resin and an amorphous vinyl resin (in particular, a styrene acrylic resin) are preferable, and an amorphous polyester resin is more preferable.

Amorphous Polyester Resin

Examples of the amorphous polyester resin include condensation polymers of a polyvalent carboxylic acid and a polyhydric alcohol. The amorphous polyester resin may be a commercially available one or a synthesized one.

Examples of the polyvalent carboxylic acid include aliphatic dicarboxylic acids, such as oxalic acid, malonic acid, maleic acid, fumaric acid, citraconic acid, itaconic acid, glutaconic acid, succinic acid, alkenyl succinic acid, adipic acid, and sebacic acid; alicyclic dicarboxylic acids, such as cyclohexanedicarboxylic acid; aromatic dicarboxylic acids, such as terephthalic acid, isophthalic acid, phthalic acid, and naphthalenedicarboxylic acid; anhydrides of these dicarboxylic acids; and lower (e.g., 1 to 5 carbon atoms) alkyl esters of these dicarboxylic acids. Among these polyvalent carboxylic acids, aliphatic dicarboxylic acids, such as adipic acid and sebacic acid that are units represented by Formula (1), may be used.

$$-OC-(CH_2)_n-CO- \quad (1)$$

where n represents an integer of 4 to 12.

In the case where the unit represented by Formula (1) is used, the proportion of units derived from the aliphatic dicarboxylic acid to units derived from acid component monomers included in the amorphous polyester resin is preferably 1 mol % or more and 30 mol % or less and is further preferably 3 mol % or more and 20 mol % or less. When the unit represented by Formula (1) is used, the likelihood of aggregation of the crosslinked resin particles may be increased and the proportion of the voids may be adjusted to fall within an adequate range. In the case where two or more types of amorphous polyester resins are used in combination, it is preferable that the content of units derived from the aliphatic dicarboxylic acid fall within the above range in terms of weighted average.

Trivalent or higher carboxylic acids having a crosslinked structure or a branched structure may be used as a polyvalent carboxylic acid in combination with the dicarboxylic acids.

Examples of the trivalent or higher carboxylic acids include trimellitic acid, pyromellitic acid, anhydrides of these carboxylic acids, and lower (e.g., 1 to 5 carbon atoms) alkyl esters of these carboxylic acids.

The above polyvalent carboxylic acids may be used alone or in combination of two or more.

Examples of the polyhydric alcohol include aliphatic diols, such as ethylene glycol, diethylene glycol, triethylene glycol, propylene glycol, butanediol, hexanediol, and neopentyl glycol; alicyclic diols, such as cyclohexanediol, cyclohexanedimethanol, and hydrogenated bisphenol A; and aromatic diols, such as bisphenol A-ethylene oxide adduct and bisphenol A-propylene oxide adduct. Among these polyhydric alcohols, for example, aromatic diols and alicyclic diols may be used. In particular, aromatic diols may be used.

Trihydric or higher alcohols having a crosslinked structure or a branched structure may be used as a polyhydric alcohol in combination with the diols. Examples of the trihydric or higher alcohols include glycerin, trimethylolpropane, and pentaerythritol.

The above polyhydric alcohols may be used alone or in combination of two or more.

The acid value of the amorphous polyester resin is preferably 5 mgKOH/g or more and 20 mgKOH/g or less and is further preferably 7 mgKOH/g or more and 16 mgKOH/g or less in order to increase the likelihood of aggregation of the crosslinked resin particles may be increased and adjust the proportion of the voids to fall within an adequate range. Moreover, the sum of the acid value and the hydroxyl value may be 15 or more and 40 or less.

The acid and hydroxyl values of the amorphous polyester resin are measured in the following manner.

The toner that is to be measured is dissolved in tetrahydrofuran (THF) to remove the insoluble component. Subsequently, the amorphous polyester resin is separated. Using the separated amorphous polyester resin, the acid and hydroxyl values of the resin is measured in accordance with the method (neutralization titration) defined by JIS K0070-1992.

Note that acid value is the milligrams of potassium hydroxide required to neutralize acidic groups (e.g., carboxyl groups) included in 1 g of a sample, and hydroxyl value is the milligrams of potassium hydroxide required to neutralize acetic acid bonded to hydroxyl groups in the acetylation of 1 g of a sample.

The glass transition temperature Tg of the amorphous polyester resin is preferably 50° C. or more and 80° C. or less and is more preferably 50° C. or more and 70° C. or less.

The glass transition temperature of the amorphous polyester resin is determined from a differential scanning calorimetry (DSC) curve obtained by DSC. More specifically, the glass transition temperature of the amorphous polyester resin is determined from the "extrapolated glass-transition-starting temperature" according to a method for determining glass transition temperature which is described in JIS K 7121:1987 "Testing Methods for Transition Temperatures of Plastics". The method for determining the measured glass transition temperatures of the other resins is the same as described above. In the measurement of the glass transition temperature of the amorphous polyester resin, the glass transition temperature of the amorphous polyester resin obtained by melt separation performed in the method described in the measurement of acid value is measured.

The weight average molecular weight Mw of the amorphous polyester resin is preferably 5,000 or more and 1,000,000 or less and is more preferably 7,000 or more and 500,000 or less.

The number average molecular weight Mn of the amorphous polyester resin may be 2,000 or more and 100,000 or less.

The molecular weight distribution index Mw/Mn of the amorphous polyester resin is preferably 1.5 or more and 100 or less and is more preferably 2 or more and 60 or less.

The weight average molecular weight and number average molecular weight of the amorphous polyester resin are determined by gel permeation chromatography (GPC). Specifically, the molecular weights of the amorphous polyester resin are determined by GPC using a "HLC-8120GPC" produced by Tosoh Corporation as measuring equipment, a column "TSKgel SuperHM-M (15 cm)" produced by Tosoh Corporation, and a THF solvent. The weight average molecular weight and number average molecular weight of the amorphous polyester resin are determined on the basis of the results of the measurement using a molecular-weight calibration curve based on monodisperse polystyrene standard samples.

The amorphous polyester resin may be produced by any suitable production method known in the related art. Specifically, the amorphous polyester resin may be produced by, for example, a method in which polymerization is performed at 180° C. or more and 230° C. or less, the pressure inside the reaction system is reduced as needed, and water and alcohols that are generated by condensation are removed.

In the case where the raw materials, that is, the monomers, are not dissolved in or miscible with each other at the reaction temperature, a solvent having a high boiling point may be used as a dissolution adjuvant in order to dissolve the raw materials. In such a case, the condensation polymerization reaction is performed while the dissolution adjuvant is distilled away. In the case where a monomer having low miscibility is present, a condensation reaction of the monomers with an acid or alcohol that is to undergo a polycondensation reaction with the monomers may be performed in advance and subsequently polycondensation of the resulting polymers with the other components may be performed.

The crystalline resin is described below.

Examples of the crystalline resin include the crystalline resins known in the related art, such as a crystalline polyester resin and a crystalline vinyl resin (e.g., a polyalkylene resin or a long-chain alkyl (meth)acrylate resin). Among these, a crystalline polyester resin may be used in consideration of the mechanical strength and low temperature fixability of the toner.

Crystalline Polyester Resin

Examples of the crystalline polyester resin include condensation polymers of a polyvalent carboxylic acid and a polyhydric alcohol. The crystalline polyester resin may be commercially available one or a synthesized one.

In order to increase ease of forming a crystal structure, a condensation polymer prepared from linear aliphatic polymerizable monomers may be used as a crystalline polyester resin instead of a condensation polymer prepared from polymerizable monomers having an aromatic ring.

Examples of the polyvalent carboxylic acid include aliphatic dicarboxylic acids, such as oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid; aromatic dicarboxylic acids, such as dibasic acids (e.g., phthalic acid, isophthalic acid, terephthalic acid, and naphthalene-2, 6-dicarboxylic acid); anhydrides of these dicarboxylic acids; and lower (e.g., 1 to 5 carbon atoms) alkyl esters of these dicarboxylic acids.

Trivalent or higher carboxylic acids having a crosslinked structure or a branched structure may be used as a polyvalent carboxylic acid in combination with the dicarboxylic acids. Examples of the trivalent carboxylic acids include aromatic carboxylic acids, such as 1,2,3-benzenetricarboxylic acid, 1,2,4-benzenetricarboxylic acid, and 1,2,4 -naphthalenetricarboxylic acid; anhydrides of these tricarboxylic acids; and lower (e.g., 1 to 5 carbon atoms) alkyl esters of these tricarboxylic acids.

Dicarboxylic acids including a sulfonic group and dicarboxylic acids including an ethylenic double bond may be used as a polyvalent carboxylic acid in combination with the above dicarboxylic acids.

The above polyvalent carboxylic acids may be used alone or in combination of two or more.

Examples of the polyhydric alcohol include aliphatic diols, such as linear aliphatic diols including a backbone having 7 to 20 carbon atoms. Examples of the aliphatic diols include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanedecanediol. Among these aliphatic diols, 1,8-octanediol, 1,9-nonanediol, and 1,10-decanediol may be used.

Trihydric or higher alcohols having a crosslinked structure or a branched structure may be used as a polyhydric alcohol in combination with the above diols. Examples of the trihydric or higher alcohols include glycerin, trimethylolethane, trimethylolpropane, and pentaerythritol.

The above polyhydric alcohols may be used alone or in combination of two or more.

The content of the aliphatic diols in the polyhydric alcohol may be 80 mol % or more and is preferably 90 mol % or more.

The melting temperature of the crystalline polyester resin is preferably 50° C. or more and 100° C. or less, is more preferably 55° C. or more and 90° C. or less, and is further preferably 60° C. or more and 85° C. or less.

The melting temperature of the crystalline polyester resin is determined from the "melting peak temperature" according to a method for determining melting temperature which is described in JIS K 7121:1987 "Testing Methods for Transition Temperatures of Plastics" using a DSC curve obtained by differential scanning calorimetry (DSC).

The crystalline polyester resin may have a weight average molecular weight Mw of 6,000 or more and 50,000 or less.

The crystalline polyester resin may be produced by any suitable method known in the related art similarly to, for example, the amorphous polyester resin.

In the case where the toner includes the crystalline resin, the proportion of the crystalline resin to the entirety of the binder resin is preferably 15% by mass or more and 40% by mass or less and is more preferably 17% by mass or more and 37% by mass or less.

When the proportion of the crystalline resin falls within the above range, the ratio between the crystalline resin and the amorphous resin may be adequate and, consequently, the low temperature fixability of the toner may be enhanced.

The binder resin may include the amorphous polyester resin and the crystalline polyester resin in order to maintain the affinity between the binder resin and the crosslinked resin particles. In the case where the binder resin includes the amorphous polyester resin and the crystalline polyester resin, since both of them include an aliphatic dicarboxylic acid unit, it becomes possible to disperse the crosslinked resin particles in a further homogeneous manner.

As an aliphatic dicarboxylic acid, for example, a saturated aliphatic dicarboxylic acid represented by HOOC—$(CH_2)_n$—COOH may be used, where n is preferably 4 to 20 and is further preferably 4 to 12.

The content of the binder resin is, for example, preferably 40% by mass or more and 98% by mass or less, is more preferably 50% by mass or more and 95% by mass or less, and is further preferably 60% by mass or more and 93% by mass or less of the whole amount of the toner.

Crosslinked Resin Particles

As described above, the electrostatic image developing toner according to this exemplary embodiment includes a binder resin and crosslinked resin particles.

Examples of the crosslinked resin particles include resin particles crosslinked with an ionic bond (ion-crosslinked particles) and resin particles crosslinked with a covalent bond (covalent bond-crosslinked particles). Among these crosslinked particles, covalent bond-crosslinked resin particles may be used.

Examples of types of the resin constituting the crosslinked resin particles include a polyolefin resin (e.g., polyethylene or polypropylene), a styrene resin (e.g., polystyrene, α-polymethylstyrene), a (meth)acrylic resin (e.g., polymethyl methacrylate or polyacrylonitrile), an epoxy resin, a polyurethane resin, a polyurea resin, a polyamide resin, a polyamide resin, a polycarbonate resin, a polyether resin, a polyester resin, and resins produced by copolymerization of the above resins. The above resins may be used alone or in a mixture of two or more as needed.

Among the above resins, a styrene-(meth)acrylate copolymer may be included in the resin constituting the crosslinked resin particles. Specifically, it is preferable that the content of the styrene-(meth)acrylate copolymer that serves as a principal component in the crosslinked resin particles be 50% by mass or more. The content of the styrene-(meth) acrylate copolymer is preferably 80% by mass or more and is more preferably 90% by mass or more. In particular, it is preferable that the crosslinked resin particles substantially be composed only of a styrene-(meth)acrylate copolymer. The ratio of the total amount of the styrene monomer and (meth)acrylic monomer to the amount of monomers constituting the copolymer is preferably 80% by mass or more, is further preferably 90% by mass or more, and is particularly preferably 95% by mass or more. Note that the balance is the crosslinking agent described below. The resin particles are converted into the crosslinked particles by the addition of the crosslinking agent.

When the crosslinked resin particles are particles of a styrene-(meth)acrylate copolymer, the likelihood of aggregation of the crosslinked resin particles may be increased and the proportion of the voids may be adjusted to fall within an adequate range.

The styrene-(meth)acrylate copolymer is, for example, a resin produced by polymerizing the styrene monomer and (meth)acrylate monomer described below by radical polymerization.

Examples of the styrene monomer include styrene, α-methylstyrene, vinylnaphthalene, alkyl-substituted styrenes having an alkyl chain, such as 2-methylstyrene, 3-methylstyrene, 4-methylstyrene, 2-ethylstyrene, 3-ethylstyrene, and 4-ethylstyrene, halogen-substituted styrenes, such as 2-chlorostyrene, 3-chlorostyrene, and 4-chlorostyrene, and fluorine-substituted styrenes, such as 4-fluorostyrene and 2,5-difluorostyrene. Among these, styrene and α-methylstyrene are preferable.

Examples of the (meth)acrylate monomer include (meth) acrylic acid, n-methyl (meth)acrylate, n-ethyl (meth)acrylate, n-propyl (meth)acrylate, n-butyl (meth)acrylate, n-pentyl (meth)acrylate, n-hexyl (meth)acrylate, n-heptyl (meth) acrylate, n-octyl (meth)acrylate, n-decyl (meth)acrylate, n-dodecyl (meth)acrylate, n-lauryl (meth)acrylate, n-tetradecyl (meth)acrylate, n-hexadecyl (meth)acrylate, n-octadecyl (meth)acrylate, isopropyl (meth)acrylate, isobutyl (meth)acrylate, t-butyl (meth)acrylate, isopentyl (meth) acrylate, amyl (meth)acrylate, neopentyl (meth)acrylate, isohexyl (meth)acrylate, isoheptyl (meth)acrylate, isooctyl (meth)acrylate, 2-ethylhexyl (meth)acrylate, phenyl (meth) acrylate, biphenyl (meth)acrylate, diphenylethyl (meth) acrylate, t-butylphenyl (meth)acrylate, terphenyl (meth) acrylate, cyclohexyl (meth)acrylate, t-butylcyclohexyl (meth)acrylate, dimethylaminoethyl (meth)acrylate, diethylaminoethyl (meth)acrylate, methoxyethyl (meth)acrylate, 2-hydroxyethyl (meth)acrylate, 2-carboxyethyl (meth)acrylate, (meth)acrylonitrile, and (meth)acrylamide. Among these, n-butyl (meth)acrylate and 2 -carboxyethyl (meth) acrylate are preferable.

Examples of the crosslinking agent used for crosslinking the resins to form the crosslinked resin particles include aromatic polyvinyl compounds, such as divinylbenzene and divinylnaphthalene; polyvinyl esters of aromatic polyvalent carboxylic acids, such as divinyl phthalate, divinyl isophthalate, divinyl terephthalate, divinyl homophthalate, trimesic acid divinyl ester, trimesic acid trivinyl ester, divinyl naphthalenedicarboxylate, and divinyl biphenylcarboxylate; divinyl esters of nitrogen-containing aromatic compounds, such as divinyl pyridinedicarboxylate; vinyl esters of unsaturated heterocyclic carboxylic acid compounds, such as vinyl pyromucate, vinyl furancarboxylate, vinyl pyrrole-2-carboxylate, and vinyl thiophenecarboxylate; (meth) acrylic acid esters of linear polyhydric alcohols, such as butanediol diacrylate, butanediol dimethacrylate, hexanediol diacrylate, hexanediol dimethacrylate, octanediol diacrylate, octanediol dimethacrylate, nonanediol diacrylate, nonanediol dimethacrylate, decanediol diacrylate, decanediol dimethacrylate, dodecanediol diacrylate, and dodecanediol dimethacrylate; (meth)acrylic acid esters of branched or substituted polyhydric alcohols, such as neopentyl glycol dimethacrylate and 2-hydroxy, 1,3-diacryloxypropane; and polyvinyl esters of polyvalent carboxylic acids, such as polyethylene glycol di(meth)acrylate, polypropylene polyethylene glycol di(meth)acrylates, divinyl succinate, divinyl fumarate, vinyl maleate, divinyl maleate, divinyl diglycolate, vinyl itaconate, divinyl itaconate, divinyl acetonedicarboxylate, divinyl glutarate, divinyl 3,3'-thiodipropionate, divinyl trans-aconitate, trivinyl trans-aconitate, divinyl adipate, divinyl pimelate, divinyl suberate, divinyl azelate, divinyl sebacate, divinyl dodecanedioate, and divinyl brassylate. The above crosslinking agents may be used alone or in combination of two or more.

Among these, a difunctional alkyl acrylate including an alkylene chain having 6 or more carbon atoms may be used as a crosslinking agent for crosslinking the resin. That is, the crosslinked resin particles may include a difunctional alkyl acrylate as a structural unit and the number of carbon atoms included in the alkylene chain of the difunctional alkyl acrylate may be 6 or more.

When crosslinked particles that include a difunctional alkyl acrylate as a structural unit, the number of carbon atoms included in the alkylene chain of the difunctional alkyl acrylate being 6 or more, is used, the deformation of the toner particles during the fixation falls within an adequate range and, as a result, a toner having suitable low temperature fixability may be readily produced. If the crosslinking density of the crosslinked resin particles is high (i.e., the distance between crosslinks is short), elasticity is increased to an excessive degree. In contrast, in the case where a difunctional acrylate having a long alkylene chain is used as a crosslinking agent, the crosslinking density is low (i.e., the distance between crosslinks is long) and the excessive increase in the elasticity of the crosslinked resin particles may be avoided.

In order to adjust the crosslinking density to fall within an adequate range, the number of carbon atoms included in the alkylene chain of the difunctional alkyl acrylate is preferably 6 or more, is more preferably 6 or more and 12 or less, and is further preferably 8 or more and 12 or less. Specific examples of the difunctional alkyl acrylate include 1,6-hexanediol acrylate, 1,6-hexanediol methacrylate, 1,8-octanediol diacrylate, 1,8-octanediol dimethacrylate, 1,9-nonanediol diacrylate, 1,9-nonanediol dimethacrylate, 1,10-decanediol diacrylate, 1,10-decanediol dimethacrylate, 1,12-dodecanediol diacrylate, and 1,12-dodecanediol dimethacrylate. Among these, 1,10-decanediol diacrylate and 1,10-decanediol dimethacrylate may be used.

The (meth)acrylate monomers used for producing the crosslinked resin particles may be a monofunctional (meth) acrylate monomer and a difunctional (meth)acrylate monomer. As a monofunctional (meth)acrylate monomer, a (meth) acrylate monomer that includes a carboxyl group and a (meth)acrylate monomer that does not include a carboxyl group may be used. When the above monomers are used, the likelihood of aggregation of the crosslinked resin particles may be increased and the proportion of the voids may be adjusted to fall within an adequate range.

Examples of the (meth)acrylate monomer including a carboxyl group include 2-carboxyethyl (meth)acrylate. The proportion of the unit derived from the (meth)acrylate monomer including a carboxyl group in the crosslinked resin particles may be 0.01% by mass or more and 0.50% by mass or less in order to increase the likelihood of aggregation of the crosslinked resin particles and adjust the proportion of the voids to fall within an adequate range. Examples of the (meth)acrylate monomer that does not include a carboxyl group include (meth)acrylic acid esters, such as n-butyl (meth)acrylate, ethyl (meth)acrylate, and 2-ethylhexyl (meth)acrylate. Examples of the difunctional (meth)acrylate monomer include the difunctional alkyl acrylate described as a crosslinking agent.

In the case where the crosslinked resin particles are composed of a polymer formed using a crosslinked resin particle-forming composition that includes a styrene monomer, a (meth)acrylate monomer, and a crosslinking agent, the fixability of the crosslinked resin particles may be controlled by adjusting the content of the crosslinking agent in the composition. For example, increasing the content of the crosslinking agent in the composition increases the likelihood of formation of crosslinked resin particles having suitable fixability. The content of the crosslinking agent in the crosslinked resin particle-forming composition is, for example, preferably 0.3 parts by mass or more and 5.0 parts by mass or less, is more preferably 0.5 parts by mass or more and 2.5 parts by mass or less, and is further preferably 1.0 parts by mass or more and 2.0 parts by mass or less relative to 100 parts by mass of total amount of the styrene monomer, the (meth)acrylate monomer, and the crosslinking agent.

The glass transition temperature Tg of the crosslinked resin particles which is measured with a differential scanning calorimeter is preferably 0° C. or more and 30° C. or less and is more preferably 5° C. or more and 25° C. or less.

When the glass transition temperature Tg of the crosslinked resin particles is 0° C. or more and 30° C. or less, the toner may have suitable low temperature fixability. If the glass transition temperature of the crosslinked resin particles is more than 30° C., the adhesion of the toner, which includes the crosslinked resin particles having a high glass transition temperature, to paper sheets is reduced. As a result, it is likely to become difficult to achieve suitable low temperature fixability. If particles having a glass transition temperature of less than 0° C., such as rubber particles, are used, the toner constantly behaves elastically at normal to high temperatures and it is likely to become difficult to achieve suitable low temperature fixability.

The glass transition temperature of the crosslinked resin particles may be determined by separating the crosslinked resin particles from the toner as a THF insoluble component. The monomers constituting the crosslinked resin particles and the proportions thereof may be determined by measuring the proportion of monomers constituting the crosslinked resin particles separated as an insoluble component.

In the case where the binder resin includes an amorphous polyester resin, when the glass transition temperature of the amorphous polyester resin is defined as T1(° C.) and the glass transition temperature of the crosslinked resin particles is defined as T2(° C.), the following relationship may be satisfied:

$$30 \leq T1 - T2 \leq 70 \text{ (° C.)}$$

When the above relationship is satisfied, the likelihood of aggregation of the crosslinked resin particles may be increased and the proportion of the voids may be adjusted to fall within an adequate range.

The glass transition temperature T1 of the amorphous polyester resin may be determined by dissolving the toner in THF to remove the insoluble component and taking the amorphous polyester resin from the toner.

The THF insoluble content in the crosslinked resin particles may be 90% by mass or more, and the degree of swelling of the crosslinked resin particles which is measured when the crosslinked resin particles are immersed in THF for 24 hours is 2 or more and 10 or less. When the crosslinked resin particles has an adequate degree of crosslinking and an adequate degree of swelling, the likelihood of the crosslinked resin particles moving during the fixation and becoming exposed at the toner surfaces may be reduced. The THF insoluble content is more preferably 95% by mass or more. The degree of swelling is more preferably 3 or more and 8 or less.

In the production of the crosslinked resin particles, the glass transition temperature, the THF insoluble content, the degree of swelling, etc. may be adjusted by, for example, changing the proportions of monomers constituting the copolymer and polymerization conditions. For example, as for polymerization conditions, the polymerization temperature, the amount of time during which polymerization is performed, and the method of addition of the polymerization initiator, and the like may be changed in a combined manner in order to control the progress of the reaction.

The THF insoluble content and degree of swelling of the crosslinked resin particles are determined in the following manner.

The mass of the mesh that wraps the resin is measured (mass: m1). Then, the sample that is to be analyzed (i.e., crosslinked resin particles) is dried. The sample is subsequently wrapped with the mesh and sealed. Then, the mass thereof is measured (mass: m2).

The sample wrapped with the mesh is immersed in THF. After 24 hours, the sample is removed from THF. After the solvent adhered on the surface of the sample has been removed, the mass of the sample is measured (mass: m3). Subsequently, the sample wrapped with the mesh is dried, and the mass of the dried sample is measured (mass: m4).

The THF insoluble content and the degree of swelling are calculated on the basis of the masses m1 to m4 above using the formulae below.

$$THF \text{ insoluble content (\% by mass)} = (m4 - m1)/(m2 - m1) \times 100$$

$$\text{Degree of swelling} = (m3 - m1)/(m4 - m1)$$

The content of the crosslinked resin particles is preferably 2% by mass or more and 20% by mass or less and is more preferably 5% by mass or more and 15% by mass or less of the total amount of the toner.

When the content of the crosslinked resin particles falls within the above range, the reduction in the adhesion of images to one another and low temperature fixability may be both achieved.

The ratio w1/w2 of the content w1 of the crosslinked resin particles in the toner to the content w2 of the crystalline resin in the toner is preferably 0.2 or more and 2.0 or less and is further preferably 0.3 or more and 1.5 or less.

When the ratio w1/w2 falls within the above range, the proportions of the crystalline resin and the crosslinked resin particles fall within a specific range, the toner particles may be capable of becoming deformed to an adequate degree during fixation, and a toner having suitable low temperature fixability may be produced.

In the case where the crosslinked resin particles are crosslinked particles, the proportions of the monomers constituting the entire crosslinked resin particles are obtained by measuring the proportions of monomers constituting crosslinked resin particles taken from the toner as tetrahydrofuran (THF)-insoluble components.

The average equivalent circle diameter of domains formed by the crosslinked resin particles in the toner is preferably 50 nm or more and 300 nm or less and is further preferably 80 nm or more and 250 nm or less. When the size of domains of the crosslinked resin particles is controlled, the likelihood of the resin particles being exposed at the surface of the fixed image may be further reduced.

The average equivalent circle diameter is measured by the following method.

The toner is mixed with an epoxy resin so as to be buried therein. The epoxy resin is then solidified. The resulting solid is sliced with an ultramicrotome device ("Ultracut UCT" produced by Leica) into a thin sample having a thickness of 80 nm or more and 130 nm or less. The thin sample is stained with ruthenium tetroxide for 3 hours in a desiccator at 30° C. A SEM image of the stained thin sample is obtained with a ultra-high resolution field emission scanning electron microscope (FE-SEM) "S-4800" produced by Hitachi High-Technologies Corporation. Since the ease of staining with ruthenium tetroxide varies by the release agent, the styrene-(meth)acrylic resin, and the polyester resin, the components are distinguished from one another in accordance with the color density resulting from the degree of staining. In the case where it is difficult to distinguish the color density due to the conditions of the sample, the amount of time during which staining is performed is adjusted.

Since domains of the colorant are smaller than domains of the release agent or domains of the crosslinked resin particles in a cross section of the toner particles, they are distinguished from the other domains by size.

The average equivalent circle diameter of domains of the crosslinked resin particles is measured by the following method.

In the SEM image, 30 cross sections of the toner particles whose maximum length is 85% or more of the volume average size of the toner particles are selected, and 100 domains of stained crosslinked resin particles are observed in total. The maximum length of each of the domains is measured. The maximum length is considered as the diameter of the domain and the arithmetic average thereof is considered as an average equivalent circle diameter.

The average equivalent circle diameter of the domains of the crosslinked resin particles is controlled by, for example, producing the toner particles by aggregation coalescence and adjusting the volume average size of the crosslinked resin particles included in the crosslinked resin particle dispersion liquid used in the production; or by preparing a plurality of crosslinked resin particle dispersion liquids having different volume average particle sizes and using the dispersion liquids in combination with one another.

The average shape factor SF-1 of domains of the crosslinked resin particles may be 130 or less. When SF-1 is 130 or less, fixation is not inhibited and staining of a post-treatment device may be reduced.

The average shape factor SF-1 is calculated using the formula below:

$$SF\text{-}1=(ML/A)\times(\pi/4)\times 100$$

where ML represents the absolute maximum length of a toner particle, and A represents the projected area of the toner particle.

Specifically, a sample is prepared as in the measurement of average equivalent circle diameter of domains. In the SEM image, 30 cross sections of the toner particles whose maximum length is 85% or more of the volume average size of the toner particles are selected, and 100 domains of stained resin particles are observed in total. The observed SEM image is captured into an image analysis processing system LUZEX (produced by NIRECO CORPORATION) to measure the maximum lengths and projected areas of the 100 particles. Then, calculation is done using the above formula, and the average thereof is calculated.

Colorant

Examples of the colorant include pigments, such as Carbon Black, Chrome Yellow, Hansa Yellow, Benzidine Yellow, Threne Yellow, Quinoline Yellow, Pigment Yellow, Permanent Orange GTR, Pyrazolone Orange, Vulcan Orange, Watching Red, Permanent Red, Brilliant Carmine 3B, Brilliant Carmine 6B, DuPont Oil Red, Pyrazolone Red, Lithol Red, Rhodamine B Lake, Lake Red C, Pigment Red, Rose Bengal, Aniline Blue, Ultramarine Blue, Calco Oil Blue, Methylene Blue Chloride, Phthalocyanine Blue, Pigment Blue, Phthalocyanine Green, and Malachite Green Oxalate; and dyes, such as acridine dyes, xanthene dyes, azo dyes, benzoquinone dyes, azine dyes, anthraquinone dyes, thioindigo dyes, dioxazine dyes, thiazine dyes, azomethine dyes, indigo dyes, phthalocyanine dyes, aniline black dyes, polymethine dyes, triphenylmethane dyes, diphenylmethane dyes, and thiazole dyes.

The above colorants may be used alone or in combination of two or more.

The colorant may optionally be subjected to a surface treatment and may be used in combination with a dispersant. Plural types of colorants may be used in combination.

For example, the content of the colorant in the entire toner particles is preferably 1% by mass or more and 30% by mass or less and is more preferably 3% by mass or more and 15% by mass or less.

Release Agent

Examples of the release agent include, but are not limited to, hydrocarbon waxes; natural waxes, such as a carnauba wax, a rice bran wax, and a candelilla wax; synthetic or mineral-petroleum-derived waxes, such as a montan wax; and ester waxes, such as a fatty-acid ester wax and a montanate wax.

The melting temperature of the release agent is preferably 50° C. or more and 110° C. or less and is more preferably 60° C. or more and 100° C. or less.

The above melting temperature is determined from the "melting peak temperature" according to a method for determining melting temperature which is described in JIS K 7121:1987 "Testing Methods for Transition Temperatures of Plastics" using a DSC curve obtained by differential scanning calorimetry (DSC).

For example, the content of the release agent in the entire toner particles is preferably 1% by mass or more and 20% by mass or less and is more preferably 4% by mass or more and 15% by mass or less.

Other Additives

Examples of the other additives include additives known in the related art, such as a magnetic substance, a charge-controlling agent, and an inorganic powder. These additives may be added to the toner particles as internal additives.

Properties, Etc. of Toner

The toner may include toner particles having a single-layer structure or a "core-shell" structure constituted by a core (i.e., core particle) and a coating layer (i.e., shell layer) covering the core.

The core-shell structure of the toner particles may be constituted by, for example, a core including the binder resin, the crosslinked resin particles, and, as needed, other additives such as a colorant and a release agent and by a coating layer including the binder resin and the crosslinked resin particles.

As described above, in a cross section of the toner particles, the area fraction (Sc) of the crosslinked resin particles is 5% or more and 40% or less, the proportion of the voids (Se) in the cross section is 1% or more and 10% or less, and the ratio Se/Sc of the proportion of the voids (Se) to the area fraction (Sc) is 0.05 or more and 1.5 or less. When the above relationships are satisfied, both low temperature fixability and stability of image gloss during high temperature storage may be achieved. It is more preferable that the area fraction (Sc) be 8% or more and 35% or less, the proportion of the voids (Se) in the cross section be 1.5% or more and 8% or less, and Se/Sc be 0.08 or more and 1.3 or less.

In the measurement of the area fraction (Sc) and the proportion of the voids (Se), a thin sample is stained with ruthenium tetroxide and a SEM image is taken as in the measurement of the average equivalent circle diameter of domains formed by the crosslinked resin particles in the toner, which is described above.

In the number average particle size distribution of the toner, the grain size distribution index GSD(p) represented by Formula (2) may be 1.20 or more and 1.35 or less. When GSD(p) falls within the above range, the number of particles having smaller diameters, which are more likely to be exposed at the surfaces, is controlled. This further reduces the likelihood of resin particles being exposed at the surface of the fixed image.

$$GSD(p)=1+(D50(p)-D16(p))/D50(p) \quad (2)$$

where D16(p) and D50(p) represent the particle sizes at which cumulative numbers reach 16% and 50%, respectively, in a cumulative number particle size distribution curve.

The volume average diameter D50v of the toner particles is preferably 2 μm or more and 10 μm or less, is more preferably 4 μm or more and 8 μm or less, and is further preferably 4 μm or more and 7 μm or less.

The various average particle sizes and various particle size distribution indices of the toner particles are measured using "COULTER MULTISIZER 3" produced by Beckman Coulter, Inc. with an electrolyte "ISOTON-II" produced by Beckman Coulter, Inc. in the following manner.

A sample to be measured (0.5 mg or more and 50 mg or less) is added to 2 ml of a 5%-aqueous solution of a surfactant (e.g., sodium alkylbenzene sulfonate) that serves as a dispersant. The resulting mixture is added to 100 ml or more and 150 ml or less of an electrolyte.

The resulting electrolyte containing the sample suspended therein is subjected to a dispersion treatment for 1 minute using an ultrasonic disperser, and the distribution of the diameters of particles having a diameter of 2 μm or more and 60 μm or less is measured using COULTER MULTISIZER 3 with an aperture having a diameter of 100 m. The number of the particles sampled is 50,000.

The particle diameter distribution measured is divided into a number of particle diameter ranges (i.e., channels). For each range, in ascending order in terms of particle diameter, the cumulative volume and the cumulative number are calculated and plotted to draw cumulative distribution curves. Particle diameters at which the cumulative volume and the cumulative number reach 16% are considered to be the volume particle diameter D16v and the number particle diameter D16p, respectively. Particle diameters at which the cumulative volume and the cumulative number reach 50% are considered to be the volume average particle diameter D50v and the number average particle diameter D50p, respectively.

The above-described volume average particle diameter D50(v) is determined by the above-described method. The number grain size distribution index GSD(p) is calculated using the above values as:

$$GSD(p)=1+(D50(p)-D16(p))/D50(p) \quad (2)$$

The toner particles preferably has an average circularity of 0.94 or more and 1.00 or less. The average circularity of the toner particles is more preferably 0.95 or more and 0.98 or less.

The average circularity of the toner particles is determined as [Equivalent circle perimeter]/[Perimeter] (i.e., [Perimeter of a circle having the same projection area as the particles]/[Perimeter of the projection image of the particles]. Specifically, the average circularity of the toner particles is determined by the following method.

The toner particles to be measured are sampled by suction so as to form a flat stream. A static image of the particles is taken by instantaneously flashing a strobe light. The image of the particles is analyzed with a flow particle image analyzer "FPIA-3000" produced by Sysmex Corporation. The number of samples used for determining the average circularity of the toner particles is 3,500.

In the case where the toner includes an external additive, the toner (i.e., the developer) to be measured is dispersed in water containing a surfactant and then subjected to an ultrasonic wave treatment in order to remove the external additive from the toner particles.

External Additive

Examples of the external additive include inorganic particles. Examples of the inorganic particles include $SiO_2$ particles, $TiO_2$ particles, $Al_2O_3$ particles, CuO particles, ZnO particles, $SnO_2$ particles, $CeO_2$ particles, $Fe_2O_3$ particles, MgO particles, BaO particles, CaO particles, $K_2O$ particles, $Na_2O$ particles, $ZrO_2$ particles, CaO—$SiO_2$ particles, $K_2O\cdot(TiO_2)_n$ particles, $Al_2O_3\cdot 2SiO_2$ particles, $CaCO_3$ particles, $MgCO_3$ particles, $BaSO_4$ particles, and $MgSO_4$ particles.

Among these, one or more elements selected from the group consisting of aluminum, molybdenum, and magnesium may be included in the external additive. When an element having high thermal conductivity is included in the toner particles, the thermal conductivity of a portion of the toner particles which is other than the voids may be increased and, as a result, fixability may be enhanced. The above elements may be included in the toner as an external additive and may also be used as an internal additive.

The surfaces of the inorganic particles used as an external additive may be subjected to a hydrophobic treatment. The hydrophobic treatment is performed by, for example, immersing the inorganic particles in a hydrophobizing agent. Examples of the hydrophobizing agent include, but are not limited to, a silane coupling agent, a silicone oil, a titanate coupling agent, and aluminum coupling agent. These hydrophobizing agents may be used alone or in combination of two or more.

The amount of the hydrophobizing agent is commonly, for example, 1 part by mass or more and 10 parts by mass or less relative to 100 parts by mass of the inorganic particles.

Examples of the external additive further include particles of a resin, such as polystyrene, polymethyl methacrylate (PMMA), or a melamine resin; and particles of a cleaning lubricant, such as a metal salt of a higher fatty acid, such as zinc stearate, or a fluorine-contained resin.

The amount of the external additive used is, for example, preferably 0.01% by mass or more and 8.0% by mass or less and is more preferably 0.01% by mass or more and 6.0% by mass or less of the amount of the toner particles.

Method for Producing Toner

A method for producing the toner according to this exemplary embodiment is described below.

The toner according to the exemplary embodiment is produced by, after the preparation of the toner particles, depositing an external additive on the surfaces of the toner particles as needed.

The toner particles may be prepared by any dry process, such as knead pulverization, or any wet process, such as aggregation coalescence, suspension polymerization, or dissolution suspension. However, a method for preparing the toner particles is not limited thereto, and any suitable method known in the related art may be used.

Among these methods, aggregation coalescence, which is a type of emulsification aggregation, may be used for preparing the toner particles in order to control the proportion of the voids and the size of domains.

In the case where emulsification aggregation is used, the proportion of the voids may be adjusted by controlling the state in which aggregation is performed when the dispersion liquids of raw materials of the toner are mixed with one another.

Specifically, in the case where, when the raw material dispersion liquids are aggregated, the crosslinked resin particles are preferentially aggregated with one another and the binder resin dispersion liquid is caused to adhere on the periphery of the aggregates, the gaps formed as a result of aggregation of the crosslinked resin particles are likely to remain in the form of voids after the toner particles have been dried, because the crosslinked resin particles are not integrated with one another even in the toner fusion step.

The ease of aggregation of the crosslinked resin particles may be controlled by adjusting the content of the (meth) acrylate monomer having a carboxyl group in the crosslinked resin particles and the acid and hydroxyl values of the amorphous polyester resin. The ease of aggregation of the crosslinked resin particles may be controlled in a further stable manner by adjusting the pH of the crosslinked resin particle dispersion liquid, the concentration of the surfactant in the system during aggregation, the amount of the coagulant, and the temperature at which the coagulant is added.

The voids may be adjusted by the addition of a foaming liquid, such as carbonic water, during aggregation or fusion to increase the likelihood of air entering inside the toner particles.

Specifically, for example, in the case where aggregation coalescence is used for producing the toner particles, the toner particles are produced by the following steps:

- preparing a binder resin particle dispersion liquid in which particles of a resin that serves as a binder resin are dispersed and a crosslinked resin particle dispersion liquid that serves as the crosslinked resin particles (crosslinked resin particle dispersion liquid preparation step);
- causing the crosslinked resin particles (and other particles as needed) to aggregate with one another in the crosslinked resin particle dispersion liquid (or a dispersion liquid that further includes the other particle dispersion liquid as needed) to form aggregated particles (aggregated particle formation step); and
- heating the resulting aggregated particle dispersion liquid in which the aggregated particles are dispersed to cause fusion and coalescence of the aggregated particles and form toner particles (fusion and coalescence step).

Each of the above steps is described below in detail.

Hereinafter, a method for preparing toner particles including a colorant and a release agent is described. However, it should be noted that the colorant and the release agent are optional. It is needless to say that additives other than a colorant or a release agent may be used.

Binder Resin Particle Dispersion Liquid Preparation Step

First, a binder resin particle dispersion liquid in which particles of a resin that serves as a binder resin are dispersed is prepared. Furthermore, for example, a colorant particle dispersion liquid in which particles of a colorant are dispersed and a release agent particle dispersion liquid in which particles of a release agent are dispersed are prepared.

The binder resin particle dispersion liquid is prepared by, for example, dispersing the binder resin particles in a dispersion medium using a surfactant.

Examples of the dispersion medium used for preparing the binder resin particle dispersion liquid include aqueous media.

Examples of the aqueous media include water, such as distilled water and ion-exchange water; and alcohols. These aqueous media may be used alone or in combination of two or more.

Examples of the surfactant include anionic surfactants, such as sulfate surfactants, sulfonate surfactants, and phosphate surfactants; cationic surfactants, such as amine salt surfactants and quaternary ammonium salt surfactants; and nonionic surfactants, such as polyethylene glycol surfactants, alkylphenol ethylene oxide adduct surfactants, and polyhydric alcohol surfactants. Among these surfactants, in particular, the anionic surfactants and the cationic surfactants may be used. The nonionic surfactants may be used in combination with the anionic surfactants and the cationic surfactants.

These surfactants may be used alone or in combination of two or more.

In the preparation of the binder resin particle dispersion liquid, the binder resin particles can be dispersed in a dispersion medium by any suitable dispersion method commonly used in the related art in which, for example, a rotary-shearing homogenizer, a ball mill, a sand mill, or a dyno mill that includes media is used. Depending on the type of the binder resin particles used, the binder resin particles may be dispersed in the binder resin particle dispersion liquid by, for example, phase-inversion emulsification.

Phase-inversion emulsification is a method in which the resin to be dispersed is dissolved in a hydrophobic organic solvent in which the resin is soluble, a base is added to the resulting organic continuous phase (i.e., O phase) to perform neutralization, and subsequently an aqueous medium (i.e., W phase) is charged in order to perform conversion of resin (i.e., phase inversion) from W/O to O/W, form a discontinuous phase, and disperse the resin in the aqueous medium in the form of particles.

The volume average diameter of the crosslinked resin particles dispersed in the crosslinked resin particle dispersion liquid is preferably, for example, 0.01 μm or more and 1 μm or less, is more preferably 0.08 μm or more and 0.8 μm or less, and is further preferably 0.1 μm or more and 0.6 μm or less.

The volume average diameter of the crosslinked resin particles is determined in the following manner. The particle diameter distribution of the resin particles is obtained using a laser-diffraction particle-size-distribution measurement apparatus, such as "LA-700" produced by HORIBA, Ltd. The particle diameter distribution measured is divided into a number of particle diameter ranges (i.e., channels). For each range, in ascending order in terms of particle diameter, the cumulative volume is calculated and plotted to draw a cumulative distribution curve. A particle diameter at which the cumulative volume reaches 50% is considered to be the volume particle diameter D50v. The volume average diameters of particles included in the other dispersion liquids are also determined in the above-described manner.

The content of the crosslinked resin particles included in the crosslinked resin particle dispersion liquid is, for example, preferably 5% by mass or more and 50% by mass or less and is more preferably 10% by mass or more and 40% by mass or less.

The colorant particle dispersion liquid, the release agent particle dispersion liquid, and the like are also prepared as in the preparation of the binder resin particle dispersion liquid. In other words, the above-described specifications for the volume average diameter of the particles included in the resin particle dispersion liquid, the dispersion medium of the resin particle dispersion liquid, the dispersion method used for preparing the resin particle dispersion liquid, and the content of the particles in the resin particle dispersion liquid can also be applied to colorant particles dispersed in the colorant particle dispersion liquid and release agent particles dispersed in the release agent particle dispersion liquid.

Preparation of Crosslinked Resin Particle Dispersion Liquid

Publicly known methods, such as emulsion polymerization, a melt-kneading method in which a Banbury mixer, a kneader, or the like is used, suspension polymerization, and spray drying, may be used for preparing the crosslinked resin particle dispersion liquid. Among these, emulsion polymerization may be used.

A styrene monomer and a (meth)acrylate monomer may be used as monomers and polymerized with each other in the presence of a crosslinking agent. In the production of the crosslinked resin particles, emulsion polymerization may be performed in a plurality of stages.

The method for producing the crosslinked resin particles is specifically described below.

The method for preparing the crosslinked resin particle dispersion liquid may include the following steps:

- preparing an emulsion including monomers, a crosslinking agent, a surfactant, and water (emulsion preparation step);
- adding a polymerization initiator to the emulsion and heating the resulting mixture to cause polymerization of the monomers (first emulsion polymerization step); and
- adding an emulsion including monomers and a crosslinking agent to the reaction solution produced by the first emulsion polymerization step and heating the resulting mixture to cause polymerization of the monomers (second emulsion polymerization step).

Emulsion Preparation Step

The emulsion preparation step is a step of preparing an emulsion including monomers, a crosslinking agent, a surfactant, and water.

The emulsion may be prepared by emulsifying monomers, a crosslinking agent, a surfactant, and water with an emulsifier.

Examples of the emulsifier include a rotary stirrer equipped with a propeller-type, anchor-type, paddle-type, or turbine-type impeller; a static mixing machine, such as a static mixer; a homogenizer; a rotor-stator emulsifier, such as CLEARMIX; a mill emulsifier having a grinding function; a high-pressure emulsifier, such as a Manton-Gaulin pressure emulsifier; a high-pressure nozzle emulsifier that generates cavitation at high pressures; a high-pressure collision emulsifier that generates a shear force by causing liquid particles to collide with one another at high pressures, such as Microfluidizer; an ultrasonic emulsifier that generates cavitation using ultrasonic waves; and a membrane emulsifier that performs homogeneous emulsification through pores.

A styrene monomer and a (meth)acrylate monomer may be used as monomers.

The crosslinking agent may be the above-described crosslinking agent.

Examples of the surfactant include anionic surfactants, such as sulfate surfactants, sulfonate surfactants, and phosphate surfactants; cationic surfactants, such as amine salt surfactants and quaternary ammonium salt surfactants; and nonionic surfactants, such as polyethylene glycol surfactants, alkylphenol ethylene oxide adduct surfactants, and polyhydric alcohol surfactants. The nonionic surfactants may be used in combination with the anionic surfactants and the cationic surfactants. Among these surfactants, the anionic surfactants may be used. These surfactants may be used alone or in combination of two or more.

The emulsion may include a chain transfer agent. The chain transfer agent may be, but not limited to, a compound having a thiol component. Specific examples thereof include alkyl mercaptans, such as hexyl mercaptan, heptyl mercaptan, octyl mercaptan, nonyl mercaptan, decyl mercaptan, and dodecyl mercaptan.

The mass ratio between the styrene monomer and (meth) acrylate monomer included in the emulsion (styrene monomer/(meth)acrylate monomer) may be 0.2 or more and 1.1 or less.

The content of the crosslinking agent may be 0.5% by mass or more and 3% by mass or less of the total amount of the emulsion.

First Emulsion Polymerization Step

The first emulsion polymerization step is a step of adding a polymerization initiator to the emulsion and heating the resulting mixture to cause polymerization of the monomers.

When polymerization is performed, the emulsion (reaction solution) including the polymerization initiator may be stirred with a stirrer.

Examples of the stirrer include a rotary stirrer equipped with a propeller-type, anchor-type, paddle-type, or turbine-type impeller.

Ammonium persulfate may be used as a polymerization initiator.

Second Emulsion Polymerization Step

The second emulsion polymerization step is a step of adding an emulsion including monomers to the reaction solution produced in the first emulsion polymerization step and heating the resulting mixture to cause polymerization of the monomers.

When polymerization is performed, the reaction solution may be stirred as in the first emulsion polymerization step.

In this step, the emulsion may be added to the reaction solution in a plurality of stages in small amounts while the ratio between the styrene monomer and the (meth)acrylate monomer included in the emulsion is changed.

The emulsion including monomers may be produced by, for example, emulsifying the monomer, a surfactant, and water with an emulsifier.

Aggregated Particle Formation Step

The binder resin particle dispersion liquid is mixed with the colorant particle dispersion liquid, the release agent particle dispersion liquid, and the crosslinked resin particle dispersion liquid.

In the resulting mixed dispersion liquid, heteroaggregation of the resin particles with the colorant particles and the release agent particles is performed in order to form aggregated particles including the resin particles, the colorant particles, and the release agent particles, the aggregated particles having a diameter closer to that of the intended toner particles.

Specifically, for example, a coagulant is added to the mixed dispersion liquid, and the pH of the mixed dispersion liquid is controlled to be acidic (e.g., pH of 2 or more and 5 or less). A dispersion stabilizer may be added to the mixed dispersion liquid as needed. Subsequently, the mixed dispersion liquid is heated to the glass transition temperature of the resin particles (specifically, e.g., [Glass transition temperature of the resin particles−30° C.] or more and [the Glass transition temperature−10° C.] or less), and thereby the particles dispersed in the mixed dispersion liquid are caused to aggregate together to form aggregated particles.

In the aggregated particle formation step, alternatively, for example, the above coagulant may be added to the mixed dispersion liquid at room temperature (e.g., 25° C.) while the mixed dispersion liquid is stirred using a rotary-shearing homogenizer. Then, the pH of the mixed dispersion liquid is controlled to be acidic (e.g., pH of 2 or more and 5 or less), and a dispersion stabilizer may be added to the mixed dispersion liquid as needed. Subsequently, the mixed dispersion liquid is heated in the above-described manner.

In this step, the state in which the resin particles are dispersed in the toner particles may be controlled by adjusting the temperature of the mixed dispersion liquid to which the coagulant is added. For example, reducing the temperature of the mixed dispersion liquid enhances the dispersibility of the resin particles. The temperature of the mixed dispersion liquid is, for example, 5° C. or more and 40° C. or less.

In this step, the state in which the resin particles are dispersed in the toner particles may be also controlled by adjusting the agitation speed subsequent to the addition of the coagulant. For example, increasing the agitation speed subsequent to the addition of the coagulant enhances the dispersibility of the resin particles.

Examples of the coagulant include surfactants, inorganic metal salts, and divalent or higher metal complexes that have a polarity opposite to that of the surfactant included in the mixed dispersion liquid as a dispersant. In particular, using a metal complex as a coagulant reduces the amount of surfactant used and, as a result, charging characteristics may be enhanced.

An additive capable of forming a complex or a bond similar to a complex with the metal ions contained in the coagulant may optionally be used. An example of the additive is a chelating agent.

Examples of the inorganic metal salts include metal salts, such as calcium chloride, calcium nitrate, barium chloride, magnesium chloride, zinc chloride, aluminum chloride, and aluminum sulfate; and inorganic metal salt polymers, such as polyaluminum chloride, polyaluminum hydroxide, and calcium polysulfide.

The chelating agent may be a water-soluble chelating agent. Examples of such a chelating agent include oxycarboxylic acids, such as tartaric acid, citric acid, and gluconic acid; and iminodiacetic acid (IDA), nitrilotriacetic acid (NTA), and ethylenediaminetetraacetic acid (EDTA).

The amount of the chelating agent used is, for example, preferably 0.01 parts by mass or more and 5.0 parts by mass or less and is more preferably 0.1 parts by mass or more and less than 3.0 parts by mass relative to 100 parts by mass of the resin particles.

Fusion Coalescence Step

The aggregated particle dispersion liquid in which the aggregated particles are dispersed is heated to, for example, a temperature equal to or higher than the glass transition temperature of the crosslinked resin particles (e.g., [Glass transition temperature of the resin particles+10° C.] or more and [the Glass transition temperature+30° C.] or less) in order to perform fusion and coalescence of the aggregated particles and form toner particles.

The toner particles are produced through the above-described steps.

The toner particles may be produced by, subsequent to the preparation of the aggregated particle dispersion liquid in which the aggregated particles are dispersed, mixing the aggregated particle dispersion liquid with a resin particle dispersion liquid in which resin particles are dispersed and another resin particle dispersion liquid in which other resin particles are dispersed and causing aggregation such that the resin particles and the other resin particles are adhered onto the surfaces of the aggregated particles to form second aggregated particles; and heating a second aggregated particle dispersion liquid in which the second aggregated particles are dispersed to cause fusion and coalescence of the second aggregated particles and form toner particles having a core-shell structure.

In the step of forming the second aggregated particles, the addition of the resin particle dispersion liquid and the adhesion of the resin particles onto the surfaces of the aggregated particles may be repeated a plurality of times.

After the completion of the fusion-coalescence step, the toner particles formed in the solution are subjected to any suitable cleaning step, solid-liquid separation step, and drying step that are known in the related art in order to obtain dried toner particles.

In the cleaning step, the toner particles may be subjected to displacement washing using ion-exchange water to a sufficient degree from the viewpoint of electrification characteristics. Examples of a solid-liquid separation method used in the solid-liquid separation step include, but are not limited to, suction filtration and pressure filtration from the viewpoint of productivity. Examples of a drying method used in the drying step include, but are not limited to, freeze-drying, flash drying, fluidized drying, and vibrating fluidized drying from the viewpoint of productivity.

The toner according to the exemplary embodiment is produced by, for example, adding an external additive to the dried toner particles and mixing the resulting toner particles using a V-blender, a HENSCHEL mixer, a Lodige mixer, or the like. Optionally, coarse toner particles may be removed using a vibrating screen classifier, a wind screen classifier, or the like.

Electrostatic Image Developer

An electrostatic image developer according to the exemplary embodiment includes at least the toner according to the exemplary embodiment or the toner according to the second exemplary embodiment.

The electrostatic image developer according to the exemplary embodiment may be a single component developer including only the toner according to the exemplary embodiment or the toner according to the second exemplary embodiment or may be a two-component developer that is a mixture of the toner and a carrier.

The type of the carrier is not limited, and any suitable carrier known in the related art may be used. Examples of the carrier include a coated carrier prepared by coating the surfaces of cores including magnetic powder particles with a resin; a magnetic-powder-dispersed carrier prepared by dispersing and mixing magnetic powder particles in a matrix resin; and a resin-impregnated carrier prepared by impregnating a porous magnetic powder with a resin.

The magnetic-powder-dispersed carrier and the resin-impregnated carrier may also be prepared by coating the surfaces of particles constituting the carrier, that is, core particles, with a resin.

Examples of the magnetic powder include powders of magnetic metals, such as iron, nickel, and cobalt; and powders of magnetic oxides, such as ferrite and magnetite.

Examples of the coat resin and the matrix resin include polyethylene, polypropylene, polystyrene, poly(vinyl acetate), poly(vinyl alcohol), poly(vinyl butyral), poly(vinyl chloride), poly(vinyl ether), poly(vinyl ketone), a vinyl chloride-vinyl acetate copolymer, a styrene-acrylic acid ester copolymer, a straight silicone resin including an organosiloxane bond and the modified products thereof, a fluorine resin, polyester, polycarbonate, a phenolic resin, and an epoxy resin.

The coat resin and the matrix resin may optionally include additives, such as conductive particles.

Examples of the conductive particles include particles of metals, such as gold, silver, and copper; and particles of carbon black, titanium oxide, zinc oxide, tin oxide, barium sulfate, aluminum borate, and potassium titanate.

The surfaces of the cores can be coated with a resin by, for example, using a coating-layer forming solution prepared by dissolving the coat resin and, as needed, various types of additives in a suitable solvent. The type of the solvent is not limited and may be selected with consideration of the type of the resin used, ease of applying the coating-layer forming solution, and the like.

Specific examples of a method for coating the surfaces of the cores with the coat resin include an immersion method in which the cores are immersed in the coating-layer forming solution; a spray method in which the coating-layer forming solution is sprayed onto the surfaces of the cores; a fluidized-bed method in which the coating-layer forming solution is sprayed onto the surfaces of the cores while the cores are floated using flowing air; and a kneader-coater method in which the cores of the carrier are mixed with the coating-layer forming solution in a kneader coater and subsequently the solvent is removed.

The mixing ratio (i.e., mass ratio) of the toner to the carrier in the two-component developer is preferably toner: carrier=1:100 to 30:100 and is more preferably 3:100 to 20:100.

Image Forming Apparatus and Image Forming Method

An image forming apparatus and an image forming method according to the exemplary embodiment are described below.

The image forming apparatus according to the exemplary embodiment includes an image holding member; a charging unit that charges the surface of the image holding member; an electrostatic image formation unit that forms an electrostatic image on the charged surface of the image holding member; a developing unit that includes an electrostatic image developer and develops the electrostatic image formed on the surface of the image holding member with the electrostatic image developer to form a toner image; a transfer unit that transfers the toner image formed on the surface of the image holding member onto the surface of a recording medium; and a fixing unit that fixes the toner image onto the surface of the recording medium. The electrostatic image developer is the electrostatic image developer according to the exemplary embodiment.

The image forming apparatus according to the exemplary embodiment uses an image forming method (image forming method according to the exemplary embodiment) including charging the surface of the image holding member; forming an electrostatic image on the charged surface of the image holding member; developing the electrostatic image formed on the surface of the image holding member with the electrostatic image developer according to the exemplary embodiment to form a toner image; transferring the toner image formed on the surface of the image holding member onto the surface of a recording medium; and fixing the toner image onto the surface of the recording medium.

The image forming apparatus according to the exemplary embodiment may be any image forming apparatus known in the related art, such as a direct-transfer image forming apparatus in which a toner image formed on the surface of an image holding member is directly transferred to a recording medium; an intermediate-transfer image forming apparatus in which a toner image formed on the surface of an image holding member is transferred onto the surface of an intermediate transfer body in the first transfer step and the toner image transferred on the surface of the intermediate transfer body is transferred onto the surface of a recording medium in the second transfer step; an image forming apparatus including a cleaning unit that cleans the surface of the image holding member subsequent to the transfer of the toner image before the image holding member is again charged; and an image forming apparatus including a static-erasing unit that erases static by irradiating the surface of an image holding member with static-erasing light subsequent to the transfer of the toner image before the image holding member is again charged.

In the case where the image forming apparatus according to this exemplary embodiment is the intermediate-transfer image forming apparatus, the transfer unit may be constituted by, for example, an intermediate transfer body to which a toner image is transferred, a first transfer subunit that transfers a toner image formed on the surface of the image holding member onto the surface of the intermediate transfer body in the first transfer step, and a second transfer subunit that transfers the toner image transferred on the surface of the intermediate transfer body onto the surface of a recording medium in the second transfer step.

In the image forming apparatus according to the exemplary embodiment, for example, a portion including the developing unit may have a cartridge structure (i.e., process cartridge) detachably attachable to the image forming apparatus. An example of the process cartridge is a process cartridge including the electrostatic image developer according to the exemplary embodiment and the developing unit.

An example of the image forming apparatus according to the exemplary embodiment is described below, but the image forming apparatus is not limited thereto. Hereinafter, only components illustrated in drawings are described; others are omitted.

FIG. 1 schematically illustrates the image forming apparatus according to the exemplary embodiment.

The image forming apparatus illustrated in FIG. 1 includes first to fourth electrophotographic image formation units 10Y, 10M, 10C, and 10K that form yellow (Y), magenta (M), cyan (C), and black (K) images, respectively, on the basis of color separation image data. The image formation units (hereinafter, referred to simply as "units") 10Y, 10M, 10C, and 10K are horizontally arranged in parallel at a predetermined distance from one another. The units 10Y, 10M, 10C, and 10K may be process cartridges detachably attachable to the image forming apparatus.

An intermediate transfer belt (an example of the intermediate transfer body) 20 runs above and extends over the units 10Y, 10M, 10C, and 10K so as to pass through the units. The intermediate transfer belt 20 is wound around a drive roller 22 and a support roller 24 arranged to contact with the inner surface of the intermediate transfer belt 20 and runs in the direction from the first unit 10Y to the fourth unit 10K. Using a spring or the like (not illustrated), a force is applied to the support roller 24 in a direction away from the drive roller 22, thereby applying tension to the intermediate transfer belt 20 wound around the drive roller 22 and the support roller 24. An intermediate transfer belt-cleaning device 30 is disposed so as to contact with the image holding member-side surface of the intermediate transfer belt 20 and to face the drive roller 22.

Developing devices (i.e., examples of developing units) 4Y, 4M, 4C, and 4K of the units 10Y, 10M, 10C, and 10K are supplied with yellow, magenta, cyan, and black toners stored in toner cartridges 8Y, 8M, 8C, and 8K, respectively.

Since the first to fourth units 10Y, 10M, 10C, and 10K have the same structure and the same action, the following description is made with reference to, as a representative, the first unit 10Y that forms an yellow image and is located upstream in a direction in which the intermediate transfer belt runs.

The first unit 10Y includes a photosensitive member 1Y serving as an image holding member. The following components are disposed around the photosensitive member 1Y sequentially in the counterclockwise direction: a charging roller (example of the charging unit) 2Y that charges the surface of the photosensitive member 1Y at a predetermined potential; an exposure device (example of the electrostatic image formation unit) 3 that forms an electrostatic image by irradiating the charged surface of the photosensitive member 1Y with a laser beam 3Y based on a color separated image signal; a developing device (example of the developing unit) 4Y that develops the electrostatic image by supplying a charged toner to the electrostatic image; a first transfer roller (example of the first transfer subunit) 5Y that transfers the developed toner image to the intermediate transfer belt 20; and a photosensitive-member cleaning device (example of the image holding member-cleaning unit) 6Y that removes a toner remaining on the surface of the photosensitive member 1Y after the first transfer.

The first transfer roller 5Y is disposed so as to contact with the inner surface of the intermediate transfer belt 20 and to face the photosensitive member 1Y. Each of the first transfer rollers 5Y, 5M, 5C, and 5K of the respective units is connected to a bias power supply (not illustrated) that applies a first transfer bias to the first transfer rollers. Each bias power supply varies the transfer bias applied to the corresponding first transfer roller on the basis of the control by a controller (not illustrated).

The action of forming a yellow image in the first unit 10Y is described below.

Before the action starts, the surface of the photosensitive member 1Y is charged at a potential of −600 to −800 V by the charging roller 2Y.

The photosensitive member 1Y is formed by stacking a photosensitive layer on a conductive substrate (e.g., volume resistivity at 20° C.: $1\times10^{-6}$ Ωcm or less). The photosensitive layer is normally of high resistance (comparable with the resistance of ordinary resins), but, upon being irradiated with the laser beam, the specific resistance of the portion irradiated with the laser beam varies. Thus, the exposure device 3 irradiates the surface of the charged photosensitive member 1Y with the laser beam 3Y on the basis of the image data of the yellow image sent from the controller (not illustrated). As a result, an electrostatic image of yellow image pattern is formed on the surface of the photosensitive member 1Y.

The term "electrostatic image" used herein refers to an image formed on the surface of the photosensitive member 1Y by charging, the image being a "negative latent image" formed by irradiating a portion of the photosensitive layer with the laser beam 3Y to reduce the specific resistance of the irradiated portion such that the charges on the irradiated surface of the photosensitive member 1Y discharge while the charges on the portion that is not irradiated with the laser beam 3Y remain.

The electrostatic image, which is formed on the photosensitive member 1Y as described above, is sent to the predetermined developing position by the rotating photosensitive member 1Y. The electrostatic image on the photosensitive member 1Y is developed and visualized in the form of a toner image by the developing device 4Y at the developing position.

The developing device 4Y includes an electrostatic image developer including, for example, at least, a yellow toner and a carrier. The yellow toner is stirred in the developing device 4Y to be charged by friction and supported on a developer roller (example of the developer support), carrying an electric charge of the same polarity (i.e., negative) as the electric charge generated on the photosensitive member 1Y. The yellow toner is electrostatically adhered to the erased latent image portion on the surface of the photosensitive member 1Y as the surface of the photosensitive member 1Y passes through the developing device 4Y. Thus, the latent image is developed using the yellow toner. The photosensitive member 1Y on which the yellow toner image is formed keeps rotating at the predetermined rate, thereby transporting the toner image developed on the photosensitive member 1Y to the predetermined first transfer position.

Upon the yellow toner image on the photosensitive member 1Y reaching the first transfer position, first transfer bias is applied to the first transfer roller 5Y so as to generate an electrostatic force on the toner image in the direction from the photosensitive member 1Y toward the first transfer roller 5Y. Thus, the toner image on the photosensitive member 1Y is transferred to the intermediate transfer belt 20. The transfer bias applied has the opposite polarity (+) to that of the toner (−) and controlled to be, for example, in the first unit 10Y, +10 μA by a controller (not illustrated).

The toner particles remaining on the photosensitive member 1Y are removed by the photosensitive-member cleaning device 6Y and then collected.

Each of the first transfer biases applied to first transfer rollers 5M, 5C, and 5K of the second, third, and fourth units 10M, 10C, and 10K is controlled in accordance with the first unit 10Y.

Thus, the intermediate transfer belt 20, on which the yellow toner image is transferred in the first unit 10Y, is successively transported through the second to fourth units 10M, 10C, and 10K while toner images of the respective colors are stacked on top of another.

The resulting intermediate transfer belt 20 on which toner images of four colors are multiple-transferred in the first to fourth units is then transported to a second transfer section including a support roller 24 contacting with the inner surface of the intermediate transfer belt 20 and a second transfer roller (example of the second transfer subunit) 26 disposed on the image-carrier-side of the intermediate transfer belt 20. A recording paper (example of the recording medium) P is fed by a feed mechanism into a narrow space between the second transfer roller 26 and the intermediate transfer belt 20 that contact with each other at the predetermined timing. The second transfer bias is then applied to the support roller 24. The transfer bias applied here has the same polarity (−) as that of the toner (−) and generates an electrostatic force on the toner image in the direction from the intermediate transfer belt 20 toward the recording paper P. Thus, the toner image on the intermediate transfer belt 20 is transferred to the recording paper P. The intensity of the second transfer bias applied is determined on the basis of the resistance of the second transfer section which is detected by a resistance detector (not illustrated) that detects the resistance of the second transfer section and controlled by changing voltage.

The recording paper P on which the toner image is transferred is transported into a nip part of the fixing device (example of the fixing unit) 28 at which a pair of fixing rollers contact with each other. The toner image is fixed to the recording paper P to form a fixed image. The recording paper P, to which the color image has been fixed, is transported toward an exit portion. Thus, the series of the steps for forming a color image are terminated.

Examples of the recording paper P to which a toner image is transferred include plain paper used in electrophotographic copiers, printers, and the like. Instead of the recording paper P, OHP films and the like may be used as a recording medium.

The surface of the recording paper P may be smooth in order to enhance the smoothness of the surface of the fixed image. Examples of such a recording paper include coated paper produced by coating the surface of plain paper with resin or the like and art paper for printing.

Process Cartridge and Toner Cartridge

A process cartridge according to the exemplary embodiment is described below.

The process cartridge according to the exemplary embodiment includes a developing unit that includes the electrostatic image developer according to the exemplary embodiment and develops an electrostatic image formed on the surface of an image holding member with the electrostatic image developer to form a toner image. The process cartridge according to the exemplary embodiment is detachably attachable to an image forming apparatus.

The process cartridge according to the exemplary embodiment may further include, in addition to the developing unit, at least one unit selected from an image holding member, a charging unit, an electrostatic image formation unit, a transfer unit, etc.

An example of the process cartridge according to the exemplary embodiment is described below, but the process cartridge is not limited thereto. Hereinafter, only components illustrated in FIG. 2 are described; others are omitted.

Figure 2:
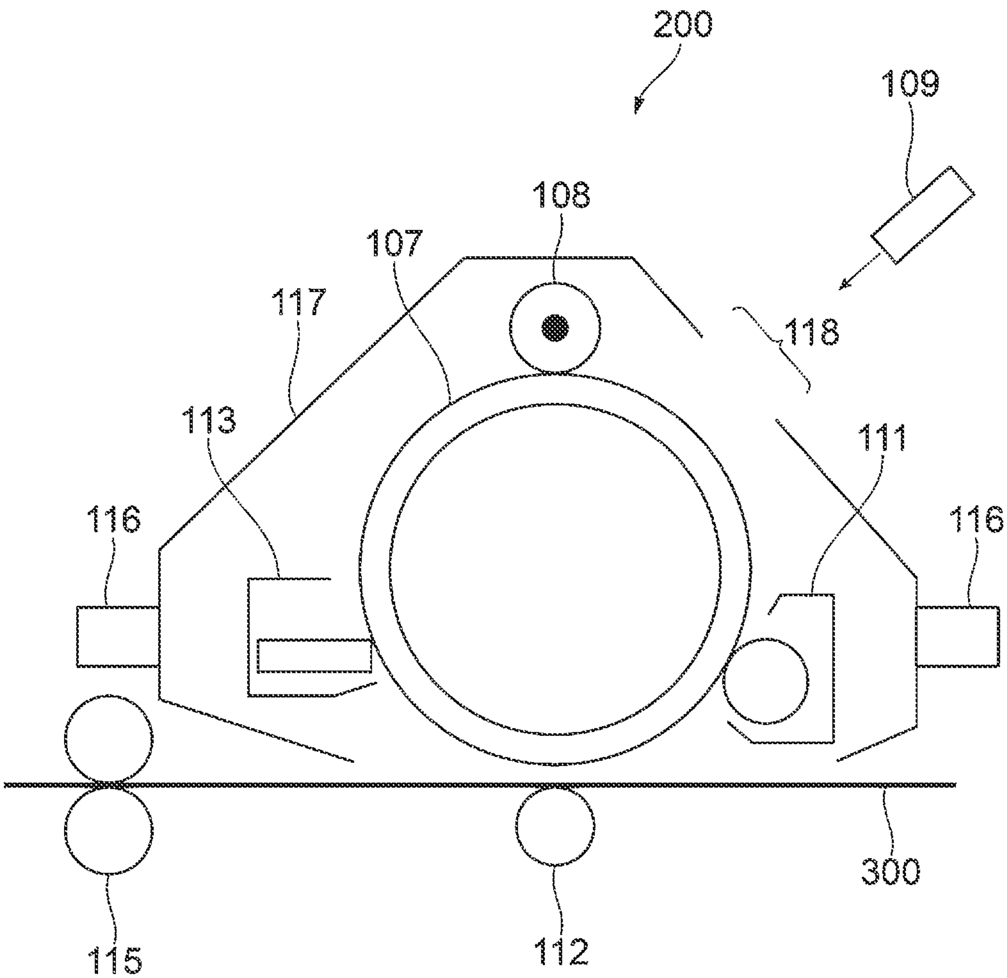
FIG. 2 is a schematic diagram illustrating an example of a process cartridge detachably attachable to the image forming apparatus according to the exemplary embodiment.

FIG. 2 schematically illustrates an example of the process cartridge according to the exemplary embodiment.

A process cartridge 200 illustrated in FIG. 2 includes, for example, a photosensitive member 107 (example of the image holding member), a charging roller 108 (example of the charging unit) disposed on the periphery of the photosensitive member 107, a developing device 111 (example of the developing unit), and a photosensitive-member cleaning device 113 (example of the cleaning unit), which are combined into one unit using a housing 117 to form a cartridge. The housing 117 has an aperture 118 for exposure. A mounting rail 116 is disposed on the housing 117.

In FIG. 2, Reference numeral 109 denotes an exposure device (example of the electrostatic image formation unit), Reference numeral 112 denotes a transfer device (example of the transfer unit), Reference numeral 115 denotes a fixing device (example of the fixing unit), and the Reference numeral 300 denotes recording paper (example of the recording medium).

A toner cartridge according to the exemplary embodiment is described below.

The toner cartridge according to the exemplary embodiment is a toner cartridge that includes the toner according to the exemplary embodiment and is detachably attachable to an image forming apparatus. The toner cartridge includes a replenishment toner that is to be supplied to the developing unit disposed inside an image forming apparatus.

The image forming apparatus illustrated in FIG. 1 is an image forming apparatus that includes the toner cartridges 8Y, 8M, 8C, and 8K detachably attached to the image forming apparatus. Each of the developing devices 4Y, 4M, 4C, and 4K is connected to a specific one of the toner cartridges which corresponds to the color of the developing device with a toner supply pipe (not illustrated). When the amount of toner contained in a toner cartridge is small, the toner cartridge is replaced.

EXAMPLES

Details of the exemplary embodiments of the present disclosure are described with reference to Examples below. It should be noted that the exemplary embodiments of the present disclosure are not limited by Examples. Hereinafter, all "part" and "%" are on a mass basis unless otherwise specified.

Preparation of Emulsion 1

Styrene: 49 parts
n-Butyl acrylate: 49 parts
1,10-Decanediol diacrylate: 1.9 parts
2-Carboxyethyl acrylate: 0.1 parts
Anionic surfactant ("Dowfax2a-1" produced by The Dow Chemical Company): 1.2 parts
Ion-exchange water: 98.8 parts The above materials are charged into a mixing container equipped with a stirring device and the resulting mixture is stirred to form an emulsion 1.

Preparation of Crosslinked Resin Particle Dispersion Liquid 1

After the inside of a reactor equipped with a stirring device and a nitrogen introduction tube has been purged with nitrogen, 0.3 parts of an anionic surfactant (Dowfax2a-1) and 100 parts of ion-exchange water are added to the reactor. While being stirred, the resulting reaction solution is heated in an oil bath until the temperature of the reaction solution reaches 65° C. After 12 parts of the emulsion has been added to the solution, 4 parts of an aqueous ammonium persulfate solution the concentration of which has been adjusted to 10% is added to the solution. Subsequently, holding is performed for 30 minutes.

While the temperature of the reaction solution is maintained at 65° C., 198 parts of the emulsion 1 is gradually added dropwise to the reactor with a pump over 180 minutes.

Subsequent to the addition of the emulsions, holding is performed for 60 minutes. Then, 2 parts of ammonium persulfate having a concentration of 10% is added to the reactor. After holding has been performed for another 3 hours, the temperature is reduced to room temperature. Subsequently, ion-exchange water and nitric acid are added to the reactor such that the solid content concentration reaches 20% and the pH reaches 2.0. Hereby, a crosslinked resin particle dispersion liquid 1 is prepared.

The resulting crosslinked resin particles have a volume average size of 160 nm. The glass transition temperature measured with a differential scanning calorimeter is 12° C.

Preparation of Crosslinked Resin Particle Dispersion Liquid 2

Preparation of Emulsion 2

Styrene: 49 parts
n-Butyl acrylate: 49.05 parts
1,10-Decanediol diacrylate: 1.9 parts
2-Carboxyethyl acrylate: 0.05 parts Anionic surfactant ("Dowfax2a-1" produced by The Dow Chemical Company): 1.4 parts Ion-exchange water: 98.8 parts The above materials are charged into a mixing container equipped with a stirring device and the resulting mixture is stirred to form an emulsion 2.

A crosslinked resin particle dispersion liquid 2 is prepared as in the preparation of the crosslinked resin particle dispersion liquid 1, except that the emulsion 1 is replaced with the emulsion 2, and the amount of nitric acid added is adjusted such that the pH of the dispersion liquid is changed from 2.0 to 3.0.

The resulting crosslinked resin particles have a volume average size of 160 nm. The glass transition temperature measured with a differential scanning calorimeter is 12° C.

Preparation of Crosslinked Resin Particle Dispersion Liquid 3

Preparation of Emulsion 3

Styrene: 49.0 parts n-Butyl acrylate: 48.7 parts 1,10-Decanediol diacrylate: 1.9 parts 2-Carboxyethyl acrylate: 0.3 parts Anionic surfactant ("Dowfax2a-1" produced by The Dow Chemical Company): 1.0 parts Ion-exchange water: 98.8 parts The above materials are charged into a mixing container equipped with a stirring device and the resulting mixture is stirred to form an emulsion 3.

A crosslinked resin particle dispersion liquid 3 is prepared as in the preparation of the crosslinked resin particle dispersion liquid 1, except that the emulsion 1 is replaced with the emulsion 3, and the amount of nitric acid added is adjusted such that the pH of the dispersion liquid is changed from 2.0 to 1.6.

The resulting crosslinked resin particles have a volume average size of 160 nm. The glass transition temperature measured with a differential scanning calorimeter is 12° C.

Preparation of Crosslinked Resin Particle Dispersion Liquid 4

Preparation of Emulsion 4

Styrene: 41 parts n-Butyl acrylate: 57 parts 1,10-Decanediol diacrylate: 1.9 parts 2-Carboxyethyl acrylate: 0.1 parts Anionic surfactant ("Dowfax2a-1" produced by The Dow Chemical Company): 1.2 parts Ion-exchange water: 98.8 parts The above materials are charged into a mixing container equipped with a stirring device and the resulting mixture is stirred to form an emulsion 4.

A crosslinked resin particle dispersion liquid 4 is prepared as in the preparation of the crosslinked resin particle dispersion liquid 1, except that the emulsion 1 is replaced with the emulsion 4.

The resulting crosslinked resin particles have a volume average size of 170 nm. The glass transition temperature measured with a differential scanning calorimeter is −1° C.

Preparation of Crosslinked Resin Particle Dispersion Liquid 5

Preparation of Emulsion 5

Styrene: 59 parts n-Butyl acrylate: 39 parts 1,10-Decanediol diacrylate: 1.9 parts 2-Carboxyethyl acrylate: 0.1 parts Anionic surfactant ("Dowfax2a-1" produced by The Dow Chemical Company): 1.2 parts Ion-exchange water: 98.8 parts The above materials are charged into a mixing container equipped with a stirring device and the resulting mixture is stirred to form an emulsion 5.

A crosslinked resin particle dispersion liquid 5 is prepared as in the preparation of the crosslinked resin particle dispersion liquid 1, except that the emulsion 1 is replaced with the emulsion 5.

The resulting crosslinked resin particles have a volume average size of 160 nm. The glass transition temperature measured with a differential scanning calorimeter is 31° C.

Preparation of Crosslinked Resin Particle Dispersion Liquid 6

Preparation of Emulsion 6

Styrene: 49.5 parts n-Butyl acrylate: 49.5 parts 1,6-Hexanediol acrylate: 0.9 parts 2-Carboxyethyl acrylate: 0.1 parts Anionic surfactant ("Dowfax2a-1" produced by The Dow Chemical Company): 1.2 parts Ion-exchange water: 98.8 parts The above materials are charged into a mixing container equipped with a stirring device and the resulting mixture is stirred to form an emulsion 6.

A crosslinked resin particle dispersion liquid 6 is prepared as in the preparation of the crosslinked resin particle dispersion liquid 1, except that the emulsion 1 is replaced with the emulsion 6 and the amount of aqueous ammonium persulfate solution added is changed from 4 parts to 3.5 parts.

The resulting crosslinked resin particles have a volume average size of 160 nm. The glass transition temperature measured with a differential scanning calorimeter is 11° C.

Preparation of Crosslinked Resin Particle Dispersion Liquid 7

A crosslinked resin particle dispersion liquid 7 is prepared as in the preparation of the crosslinked resin particle dispersion liquid 1, except that the temperature of the reaction container is changed from 65° C. to 78° C. and the amount of aqueous ammonium persulfate solution added is changed from 4 parts to 4.5 parts.

The resulting crosslinked resin particles have a volume average size of 150 nm. The glass transition temperature measured with a differential scanning calorimeter is 13° C.

Preparation of Crosslinked Resin Particle Dispersion Liquid 8

Preparation of Emulsion 8

Styrene: 49.5 parts n-Butyl acrylate: 49.5 parts 1,12-Dodecanediol diacrylate: 1.0 parts 2-Carboxyethyl acrylate: 0.1 parts Anionic surfactant ("Dowfax2a-1" produced by The Dow Chemical Company): 1.2 parts Ion-exchange water: 98.8 parts The above materials are charged into a mixing container equipped with a stirring device and the resulting mixture is stirred to form an emulsion 8.

A crosslinked resin particle dispersion liquid 8 is prepared as in the preparation of the crosslinked resin particle dispersion liquid 1, except that the emulsion 1 is replaced with the emulsion 8 and the amount of time during which the emulsion is added dropwise is changed from 180 minutes to 150 minutes.

The resulting crosslinked resin particles have a volume average size of 180 nm. The glass transition temperature measured with a differential scanning calorimeter is 11° C.

Preparation of Crosslinked Resin Particle Dispersion Liquid 9

Preparation of Emulsion 9

An emulsion 9 is prepared as in the preparation of emulsion 1, except that 1,10-decanediol diacrylate is replaced with divinylbenzene.

A crosslinked resin particle dispersion liquid 9 is prepared as in the preparation of the crosslinked resin particle dispersion liquid 1, except that the emulsion 1 is replaced with the emulsion 9 and the amount of time during which the emulsion is added dropwise is changed from 180 minutes to 150 minutes.

The resulting crosslinked resin particles have a volume average size of 180 nm. The glass transition temperature measured with a differential scanning calorimeter is 11° C.

Preparation of Crosslinked Resin Particle Dispersion Liquid 10

An emulsion 10 is prepared as in the preparation of emulsion 1, except that the amount of styrene is changed from 49 parts to 49.1 parts and the amount of 2-carboxyethyl acrylate is changed from 0.1 parts to 0 part.

A crosslinked resin particle dispersion liquid 10 is prepared as in the preparation of the crosslinked resin particle dispersion liquid 1, except that the emulsion 1 is replaced with the emulsion 10 and the amount of nitric acid added is adjusted such that the pH of the dispersion liquid is changed from 2.0 to 3.5.

The resulting crosslinked resin particles have a volume average size of 160 nm. The glass transition temperature measured with a differential scanning calorimeter is 12° C.

Preparation of Crosslinked Resin Particle Dispersion Liquid 11

An emulsion 11 is prepared as in the preparation of emulsion 1, except that the amount of styrene is changed from 49 parts to 48.55 parts and the amount of 2-carboxyethyl acrylate is changed from 0.1 parts to 0.55 part.

A crosslinked resin particle dispersion liquid 11 is prepared as in the preparation of the crosslinked resin particle dispersion liquid 1, except that the emulsion 1 is replaced with the emulsion 11.

The resulting crosslinked resin particles have a volume average size of 160 nm. The glass transition temperature measured with a differential scanning calorimeter is 12° C.

Preparation of Crosslinked Resin Particle Dispersion Liquid 12

An emulsion 12 is prepared as in the preparation of emulsion 1, except that the amount of anionic surfactant (Dowfax2a-1) charged into the reaction container is changed from 0.3 parts to 0.9 parts.

A crosslinked resin particle dispersion liquid 12 is prepared as in the preparation of the crosslinked resin particle dispersion liquid 1, except that the emulsion 1 is replaced with the emulsion 12.

The resulting crosslinked resin particles have a volume average size of 45 nm. The glass transition temperature measured with a differential scanning calorimeter is 12° C.

Preparation of Crosslinked Resin Particle Dispersion Liquid 13

An emulsion 13 is prepared as in the preparation of emulsion 1, except that the amount of anionic surfactant (Dowfax2a-1) charged into the reaction container is changed from 0.3 parts to 0.1 parts.

A crosslinked resin particle dispersion liquid 13 is prepared as in the preparation of the crosslinked resin particle dispersion liquid 1, except that the emulsion 1 is replaced with the emulsion 13 and the amount of nitric acid added is adjusted such that the pH of the dispersion liquid is changed from 2.0 to 1.6.

The resulting crosslinked resin particles have a volume average size of 310 nm. The glass transition temperature measured with a differential scanning calorimeter is 12° C.

Preparation of Crosslinked Resin Particle Dispersion Liquid 14

An emulsion 14 is prepared as in the preparation of emulsion 1, except that the amount of n-butyl acrylate is changed from 49 parts to 49.6 parts and the amount of 1,10-decanediol diacrylate is changed from 1.9 parts to 1.3 parts.

A crosslinked resin particle dispersion liquid 14 is prepared as in the preparation of the crosslinked resin particle dispersion liquid 1, except that the emulsion 1 is replaced with the emulsion 14, the temperature of the reaction container is changed from 65° C. to 62° C., and the amount of time during which the emulsion is added dropwise is changed from 180 minutes to 240 minutes.

The resulting crosslinked resin particles have a volume average size of 220 nm. The glass transition temperature measured with a differential scanning calorimeter is 11° C.

Preparation of Crosslinked Resin Particle Dispersion Liquid 15

An emulsion 15 is prepared as in the preparation of emulsion 1, except that the amount of styrene is changed from 49 parts to 57 parts and the amount of n-butyl acrylate is changed from 49 parts to 41 parts.

A crosslinked resin particle dispersion liquid 15 is prepared as in the preparation of the crosslinked resin particle dispersion liquid 1, except that the emulsion 1 is replaced with the emulsion 15.

The resulting crosslinked resin particles have a volume average size of 160 nm. The glass transition temperature measured with a differential scanning calorimeter is 27° C.

Preparation of Crosslinked Resin Particle Dispersion Liquid 16

An emulsion 16 is prepared as in the preparation of emulsion 1, except that the amount of styrene is changed from 49 parts to 43 parts and the amount of n-butyl acrylate is changed from 49 parts to 55 parts.

A crosslinked resin particle dispersion liquid 16 is prepared as in the preparation of the crosslinked resin particle dispersion liquid 1, except that the emulsion 1 is replaced with the emulsion 16.

The resulting crosslinked resin particles have a volume average size of 160 nm. The glass transition temperature measured with a differential scanning calorimeter is 3° C.

Preparation of Crosslinked Resin Particle Dispersion Liquid 17

Styrene: 48 parts
Butadiene: 50 parts
Acrylic acid: 1.9 parts
tert-Dodecanethiol: 0.1 parts
Anionic surfactant (Dowfax2a-1): 1.2 parts
Ion-exchange water: 200 parts
Potassium persulfate: 1 part The above materials are charged into a polymerization reaction container and polymerized for 2 hours at 50° C. in a nitrogen atmosphere. After the reaction has been continued for 3 hours, polymerization is terminated. Subsequently, ion-exchange water and nitric acid are added to the dispersion liquid such that the solid content concentration reaches 20% and the pH reaches 2.0. Hereby, a crosslinked resin particle dispersion liquid 17 is prepared.

Preparation of Amorphous Polyester Resin Dispersion Liquid 1

Terephthalic acid: 30 molar parts
Isophthalic acid: 10 molar parts
Adipic acid: 8.5 molar parts
Trimellitic anhydride: 2 molar parts
Bisphenol A propylene oxide 2 mol adduct: 49.5 molar parts The above materials are charged into a reactor equipped with a stirring device, a nitrogen introduction tube, a temperature sensor, and a fractionating column. The temperature is increased to 190° C. over 1 hour. To 100 parts of the above materials, 1.2 parts of dibutyltin oxide is added. While the product water is distilled away, the temperature is increased to 240° C. over 6 hours. While the temperature is maintained at 240° C., the dehydration condensation reaction is continued for 3 hours and then cooling is performed. Hereby, an amorphous polyester resin 1 is prepared.

The amorphous polyester resin 1 has an acid value of 10, a hydroxyl value of 17, a weight average molecular weight of 27,000, and a glass transition temperature of 61° C.

Amorphous polyester resin 1: 100 parts
Methyl ethyl ketone: 60 parts
Isopropanol: 10 parts
10% Aqueous ammonia solution: 3.5 parts The above materials are charged into a jacketed reaction tank equipped with a condenser, a thermometer, a water dropper, and an anchor impeller. While the liquid temperature is maintained at 50° C. with a water circulation thermostat, the amorphous polyester resin 1 is dissolved by performing stirring at 100 rpm. Then, the temperature of the water circulation thermostat is set to 40° C., and 300 parts of ion-exchange water maintained at 40° C. is added dropwise at a rate of 3 part/min in total in order to perform phase inversion. Hereby, an emulsion is prepared.

The emulsion is charged into an eggplant flask, which is connected to an evaporator equipped with a vacuum control unit with a trap ball interposed therebetween. While the eggplant flask is rotated, the temperature is increased in a hot-water bath at 60° C. With attention to bumping, the pressure is reduced to 7 kPa to remove the solvent. Subsequently, the pressure is increased to normal pressure and the eggplant flask is cooled with water. Hereby, a dispersion liquid is prepared. Ion-exchange water is added to the resulting dispersion liquid. Hereby, an amorphous polyester resin dispersion liquid 1 having a solid content of 20% is prepared. The volume average size of the amorphous polyester resin particles included in the amorphous polyester resin dispersion liquid 1 is 180 nm.

Preparation of Amorphous Polyester Resin Dispersion Liquid 2

An amorphous polyester resin dispersion liquid 2 is prepared as in the preparation of the amorphous polyester resin dispersion liquid 1, except that the amounts of the materials charged are changed as described below.

Terephthalic acid: 43 molar parts
Isophthalic acid: 2 molar parts
Adipic acid: 3 molar parts
Trimellitic anhydride: 2.5 molar parts
Bisphenol A propylene oxide 2 mol adduct: 40 molar parts
Bisphenol A ethylene oxide 2 mol adduct: 10 molar parts The amorphous polyester resin 2 has an acid value of 10, a hydroxyl value of 13, a weight average molecular weight of 32,000, and a glass transition temperature of 66° C.

The volume average size of the amorphous polyester resin particles included in the amorphous polyester resin dispersion liquid 2 is 180 nm.

Preparation of Amorphous Polyester Resin Dispersion Liquid 3

An amorphous polyester resin dispersion liquid 3 is prepared as in the preparation of the amorphous polyester resin dispersion liquid 1, except that the amounts of the materials charged are changed as described below.

Terephthalic acid: 16.5 molar parts
Isophthalic acid: 20 molar parts
Adipic acid: 12 molar parts
Trimellitic anhydride: 2 molar parts
Bisphenol A propylene oxide 2 mol adduct: 39.5 molar parts
Bisphenol A ethylene oxide 2 mol adduct: 10 molar parts The amorphous polyester resin 3 has an acid value of 12, a hydroxyl value of 20, a weight average molecular weight of 27,000, and a glass transition temperature of 55° C.

The volume average size of the amorphous polyester resin particles included in the amorphous polyester resin dispersion liquid 3 is 180 nm.

Preparation of Amorphous Polyester Resin Dispersion Liquid 4

An amorphous polyester resin dispersion liquid 4 is prepared as in the preparation of the amorphous polyester resin dispersion liquid 1, except that the amounts of the materials charged are changed as described below.

Terephthalic acid: 44 molar parts
Isophthalic acid: 2 molar parts
Sebacic acid: 1 molar part
Trimellitic anhydride: 3 molar parts
Bisphenol A propylene oxide 2 mol adduct: 36 molar parts
Bisphenol A ethylene oxide 2 mol adduct: 15 molar parts The amorphous polyester resin 4 has an acid value of 9, a hydroxyl value of 15, a weight average molecular weight of 36,000, and a glass transition temperature of 74° C.

The volume average size of the amorphous polyester resin particles included in the amorphous polyester resin dispersion liquid 4 is 200 nm.

Preparation of Amorphous Polyester Resin Dispersion Liquid 5

An amorphous polyester resin dispersion liquid 5 is prepared as in the preparation of the amorphous polyester resin dispersion liquid 1, except that the amount of the bisphenol A propylene oxide 2 mol adduct charged is changed from 49.5 molar parts to 51.5 molar parts.

The amorphous polyester resin 5 has an acid value of 4.5, a hydroxyl value of 20.5, a weight average molecular weight of 28,000, and a glass transition temperature of 61° C.

The volume average size of the amorphous polyester resin particles included in the amorphous polyester resin dispersion liquid 5 is 195 nm.

Preparation of Amorphous Polyester Resin Dispersion Liquid 6

An amorphous polyester resin dispersion liquid 6 is prepared as in the preparation of the amorphous polyester resin dispersion liquid 1, except that the amount of the bisphenol A propylene oxide 2 mol adduct charged is changed from 49.5 molar parts to 47.5 molar parts.

The amorphous polyester resin 6 has an acid value of 21, a hydroxyl value of 11, a weight average molecular weight of 25,000, and a glass transition temperature of 61° C.

The volume average size of the amorphous polyester resin particles included in the amorphous polyester resin dispersion liquid 6 is 195 nm.

Preparation of Amorphous Polyester Resin Dispersion Liquid 7

An amorphous polyester resin dispersion liquid 7 is prepared as in the preparation of the amorphous polyester resin dispersion liquid 1, except that the amount of dibutyltin oxide is changed from 1.2 parts to 1.5 parts and the amount of time during which polymerization is performed is changed from 6 hours to 9 hours.

The amorphous polyester resin 7 has an acid value of 8, a hydroxyl value of 6, a weight average molecular weight of 38,000, and a glass transition temperature of 63° C.

The volume average size of the amorphous polyester resin particles included in the amorphous polyester resin dispersion liquid 7 is 190 nm.

Preparation of Amorphous Polyester Resin Dispersion Liquid 8

An amorphous polyester resin dispersion liquid 8 is prepared as in the preparation of the amorphous polyester resin dispersion liquid 1, except that the amount of dibutyltin oxide is changed from 1.2 parts to 0.6 parts and the temperature at which polymerization is performed is changed from 240° C. to 230° C.

The amorphous polyester resin 8 has an acid value of 15, a hydroxyl value of 26, a weight average molecular weight of 23,000, and a glass transition temperature of 58° C.

The volume average size of the amorphous polyester resin particles included in the amorphous polyester resin dispersion liquid 8 is 170 nm.

Preparation of Amorphous Polyester Resin Dispersion Liquid 9

An amorphous polyester resin dispersion liquid 9 is prepared as in the preparation of the amorphous polyester resin dispersion liquid 1, except that the amounts of materials charged are changed as described below.

Terephthalic acid: 30 molar parts
Isophthalic acid: 18 molar parts
Adipic acid: 0.4 molar parts
Trimellitic anhydride: 2 molar parts
Bisphenol A propylene oxide 2 mol adduct: 49.6 molar parts The amorphous polyester resin 9 has an acid value of 10, a hydroxyl value of 18, a weight average molecular weight of 28,000, and a glass transition temperature of 63° C.

The volume average size of the amorphous polyester resin particles included in the amorphous polyester resin dispersion liquid 9 is 180 nm.

Preparation of Amorphous Polyester Resin Dispersion Liquid 10

An amorphous polyester resin dispersion liquid 10 is prepared as in the preparation of the amorphous polyester resin dispersion liquid 1, except that the amounts of materials charged are changed as described below.

Terephthalic acid: 30 molar parts
Isophthalic acid: 3 molar parts
Adipic acid: 15.5 molar parts
Trimellitic anhydride: 2 molar parts
Bisphenol A propylene oxide 2 mol adduct: 49.5 molar parts The amorphous polyester resin 10 has an acid value of 11, a hydroxyl value of 15, a weight average molecular weight of 29,000, and a glass transition temperature of 57° C.

The volume average size of the amorphous polyester resin particles included in the amorphous polyester resin dispersion liquid 10 is 180 nm.

Preparation of Amorphous Styrene Acrylic Resin Dispersion Liquid

Styrene: 78 parts
n-Butyl acrylate: 21 parts
β-Carboxyethyl acrylate: 1 part

The above materials are charged into a mixing container equipped with a stirring device, and the resulting mixture is stirred. Relative to 100 parts of the above materials, a mixed solution including 1.5 parts of an anionic surfactant ("Dowfax2a-1" produced by The Dow Chemical Company) and 48.5 parts of ion-exchange water is added to the mixing container. The resulting mixture is stirred to form an emulsion 21.

To a reaction container equipped with a stirring device and a nitrogen introduction tube, 1.5 parts of an anionic surfactant (Dowfax2a-1) and 90 parts of ion-exchange water are added. The resulting mixture is stirred. Then, 5 parts of the emulsion 21 is added to the mixture. Furthermore, 1 part of a 10% aqueous ammonium persulfate solution is added. After the inside of the reaction container has been purged with nitrogen, while the reaction solution is stirred, heating is performed in an oil bath to increase the temperature of the reaction solution to 80° C. Stirring is performed for 30 minutes.

Subsequently, 145 parts of the emulsion 21 is further added to the reaction container. While the temperature of the reaction solution is maintained at 80° C., stirring is performed for 3 hours. Then, the temperature is reduced to room temperature, and ion-exchange water is added to the dispersion liquid. Hereby, an amorphous styrene acrylic resin particle dispersion liquid having a solid content of 20% is prepared.

The volume average size of the resin particles included in the amorphous styrene acrylic resin particle dispersion liquid is 200 nm. The amorphous styrene acrylic resin has a weight average molecular weight of 33,000 and a glass transition temperature of 56° C.

Preparation of Crystalline Polyester Resin Particle Dispersion Liquid 1

Dodecanedioic acid: 50 molar parts
1,6-Hexanediol: 50 molar parts

The above materials are charged into a reactor equipped with a stirring device, a nitrogen introduction tube, a temperature sensor, and a fractionating column. The temperature is increased to 160° C. over 1 hour. To 100 parts of the above materials, 0.8 parts of dibutyltin oxide is added. While the product water is distilled away, the temperature is increased to 180° C. over 6 hours. While the temperature is maintained at 180° C. and stirring is performed for 5 hours, the reaction is continued in the container under reflux. Subsequently, the temperature is gradually increased to 230° C. under reduced pressure (3 kPa). While the temperature is maintained at 230° C., stirring is performed for 2 hours. Then, the reaction product is cooled. After cooling, solid-liquid separation is performed to dry the solid substance. Hereby, a crystalline polyester resin 1 is prepared. The crystalline polyester resin 1 has a weight average molecular weight of 29,000.

Crystalline polyester resin 1: 100 parts
Methyl ethyl ketone: 70 parts
Isopropanol: 12 parts
10% Aqueous ammonia solution: 3 parts The above materials are charged into a jacketed reaction tank equipped with a condenser, a thermometer, a water dropper, and an anchor impeller. While the liquid temperature is maintained at 80° C. with a water circulation thermostat, the crystalline polyester resin 1 is dissolved by performing stirring at 100 rpm. Then, the temperature of the water circulation thermostat is set to 60° C., and 300 parts of ion-exchange water maintained at 60° C. is added dropwise at a rate of 3 part/min in total in order to perform phase inversion. Hereby, an emulsion is prepared.

The emulsion is charged into an eggplant flask, which is connected to an evaporator equipped with a vacuum control unit with a trap ball interposed therebetween. While the eggplant flask is rotated, the temperature is increased in a hot-water bath at 60° C. With attention to bumping, the pressure is reduced to 7 kPa to remove the solvent. Subsequently, the pressure is increased to normal pressure and the eggplant flask is cooled with water. Hereby, a dispersion liquid is prepared. Ion-exchange water is added to the resulting dispersion liquid. Hereby, a crystalline polyester resin particle dispersion liquid 1 having a solid content of 20% is prepared. The volume average size of the crystalline polyester resin particles included in the crystalline polyester resin particle dispersion liquid 1 is 160 nm.

Preparation of Colorant Particle Dispersion Liquid

C.I. Pigment Blue 15:3 (produced by Dainichiseika Color & Chemicals Mfg. Co., Ltd.): 100 parts Anionic surfactant ("NEOPELEX G-65" produced by Kao Corporation): 6 parts Ion-exchange water: 300 parts The above materials are mixed with one another, and the resulting mixture is stirred with a homogenizer ("ULTRA-TURRAX T50" produced by IKA) for 10 minutes. Ion-exchange water is added to the resulting dispersion liquid. Hereby, a colorant particle dispersion liquid having a solid content of 20% is prepared. The volume average size of the colorant particles included in the colorant particle dispersion liquid is 220 nm.

Preparation of Release Agent Particle Dispersion Liquid

Fischer-Tropsch wax ("SASOLWAX H1" produced by Sasol): 100 parts

Anionic surfactant ("NEOPELEX G-65"): 6 parts

Ion-exchange water: 300 parts

The above materials are mixed with one another, and the resulting mixture is heated to 100° C. and dispersed with a homogenizer (ULTRA-TURRAX T50). Further dispersion treatment is performed with a Manton-Gaulin high pressure homogenizer (produced by Gaulin). Ion-exchange water is added to the resulting dispersion liquid. Hereby, a release agent particle dispersion liquid having a solid content of 20% is prepared.

The volume average size of the release agent particles included in the release agent particle dispersion liquid is 210 nm.

Preparation of Composite Silica Particles 1

Into a glass reaction container equipped with a metal stirring rod, a dropping nozzle, and a thermometer, 950 parts of methanol, 166 parts of ammonia water (concentration: 9.6%) are charged. The resulting mixture is stirred to form an alkali catalyst solution.

The temperature of the alkali catalyst solution is adjusted to 40° C., and the alkali catalyst solution is then purged with nitrogen. While the alkali catalyst solution is stirred, 1000 parts of tetramethoxysilane (TMOS) and 124 parts of ammonia water ($NH_4OH$) having a concentration of 7.9% are added dropwise to the alkali catalyst solution simultaneously. Hereby, a silica base particle suspension is prepared.

The silica base particle suspension is heated to 40° C. While the silica base particle suspension is stirred, 50 parts of a silane coupling agent (TMOS) is added to the suspension. Subsequently, stirring is continued for 120 minutes to cause a reaction of the silane coupling agent. As a result of the reaction, an adsorption structure is formed.

An alcohol solution is prepared by diluting a Mo-containing quaternary ammonium salt (TP-415, produced by Hodogaya Chemical Co., Ltd.) with butanol and added to the suspension. The addition of the alcohol solution is done such that 5 parts of the Mo-containing quaternary ammonium salt is added relative to 100 parts of the solid content in the silica base particle suspension. Subsequently, stirring is performed at 30° C. for 100 minutes. Hereby, a suspension is prepared.

Then, 300 parts of the suspension is charged into a reaction vessel. While the suspension is stirred, carbon dioxide is charged into the vessel. The temperature and pressure inside the reaction vessel are increased to 150° C. and 15 MPa. While stirring is performed with the above temperature and pressure being maintained, carbon dioxide is charged and discharged at a flow rate of 5 L/min. Then, the solvent is removed over 120 minutes. Hereby, composite silica particles 1 are prepared.

Preparation of Toner 1

Amorphous polyester resin particle dispersion liquid (1) (solid content: 20%): 28 parts Crosslinked resin particle dispersion liquid 1 (solid content: 20%): 14 parts Crystalline polyester resin dispersion liquid (solid content: 20%): 20 parts Colorant particle dispersion liquid (solid content: 20%): 6 parts Release agent particle dispersion liquid (solid content: 20%): 8 parts Anionic surfactant ("ELEMINOL MON-2" produced by Sanyo Chemical Industries, Ltd.): 0.7 parts Ion-exchange water: 50 parts The above materials are charged into a reactor equipped with a thermometer, a pH meter, and a stirrer. With the temperature of the reactor being maintained at 20° C., holding is performed for 30 minutes while stirring is performed at a rotational speed of 150 rpm. Subsequently, a 0.3N aqueous nitric acid solution is added to the mixture in order to adjust the pH to 4.5. Then, while dispersion is performed with a homogenizer (ULTRA-TURRAX T50), 20 parts of a 2% aqueous aluminum sulfate solution (coagulant) is added to the mixture. Subsequently, while stirring is performed, the temperature is increased to 45° C. at a rate of 0.4° C./min and holding is performed for 30 minutes.

Then, 24 parts of the amorphous polyester resin particle dispersion liquid 1 is added to the mixture, and holding is performed for 30 minutes. Subsequently, a 0.1 N aqueous sodium hydroxide solution is added to the mixture in order to adjust the pH to 8.5. After holding has been performed for 15 minutes, while stirring is continued, the temperature is increased to 80° C. at a rate of 1° C./min and holding is performed at 80° C. for 5 hours. Then, cooling and solid-liquid separation are performed. The resulting solid substance is washed with ion-exchange water and then dried with a vacuum freeze dryer for 24 hours. Hereby, toner particles 1 having a volume average size of 5.3 μm are prepared. The grain size distribution index GSD(p) of the toner particles 1 is 1.25.

Toner particles 1: 100 parts

Composite silica particles 1: 0.4 parts

Hydrophobic silica (RY50, produced by Nippon Aerosil Co., Ltd.): 2.2 parts

Aluminum oxide (ALuC805, produced by Nippon Aerosil Co., Ltd.): 0.2 parts

The above materials are mixed with one another with a Henschel mixer to form a toner 1. Note that the materials other than the toner particles 1 are external additives.

Preparation of Carrier

Ferrite particles (average particle size: 35 m): 100 parts

Toluene: 14 parts

Styrene-methyl methacrylate copolymer (copolymerization ratio: 15/85): 3 parts

Carbon black: 0.2 parts

The above components other than the ferrite particles are dispersed with a sand mill to form a dispersion liquid. The dispersion liquid and the ferrite particles are charged into a degassing vacuum kneader. While stirring is performed, the pressure is reduced to perform drying. Hereby, a carrier is prepared. With 8 parts of the toner 1, 92 parts of the carrier is mixed. Hereby, a developer 1 is formed.

Preparation of Toners 2 to 29 and 33 to 39

Toners 2 to 29 and 33 to 39 are prepared as in the preparation of the toner 1, except that the types of the materials used, the amounts of the materials added, the pH of the crosslinked resin particle dispersion liquid, and the temperature at which the coagulant is added are changed as described in Table 1.

Preparation of Toner 30

The toner particles 1 are subjected to an Elbow-Jet classifier ("EJ-30" produced by Nittetsu Mining Co., Ltd.) to remove a fine powder component. Hereby, toner particles 30 having a GSD(p) of 1.19 are prepared.

The toner particles 30 are mixed with an external additive as in the preparation of the toner 1. Hereby, a toner 30 is prepared.

Preparation of Toner 31

Toner particles 31 having a GSD(p) of 1.36 are prepared as in the preparation of the toner particles 1, except that the rate at which the temperature is increased to 45° C. is changed from 0.4° C./min to 1.5° C./min and the pH at which the 0.1 N aqueous sodium hydroxide solution is added is changed from 8.5 to 9.0.

The toner particles 31 are mixed with an external additive as in the preparation of the toner 1. Hereby, a toner 31 is prepared.

Preparation of Toner 32

Toner particles 1: 100 parts

Hydrophobic silica ("RY50" produced by Nippon Aerosil Co., Ltd.): 2.2 parts

Hydrophobic silica ("PM-20" produced by Tokuyama Corporation): 0.5 parts

The above materials are mixed with one another using a Henschel mixer to form a toner 32.

| | | Initially charged dispersion liquid | | | | | |
|---|---|---|---|---|---|---|---|
| | | Crosslinked resin particles | | | Amorphous polyester resin | | |
| Example, Comparative example | Toner | Type of crosslinked resin particle dispersion liquid | pH of dispersion liquid | Amount added (part) | Type (only in Example 19, styrene acrylate resin) | Amount added (part) | Crystalline resin Amount added (part) |
| Example 1 | Toner 1 | 1 | 2 | 14 | 1 | 28 | 20 |
| Example 2 | Toner 2 | 1 | 2 | 4 | 1 | 38 | 20 |
| Example 3 | Toner 3 | 1 | 2 | 22 | 1 | 20 | 20 |
| Example 4 | Toner 4 | 2 | 3 | 12 | 1 | 30 | 20 |
| Example 5 | Toner 5 | 3 | 1.6 | 16 | 1 | 26 | 20 |
| Example 6 | Toner 6 | 2 | 3 | 19 | 1 | 23 | 20 |
| Example 7 | Toner 7 | 3 | 1.6 | 4 | 1 | 38 | 20 |
| Example 8 | Toner 8 | 4 | 2 | 14 | 1 | 28 | 20 |
| Example 9 | Toner 9 | 5 | 2 | 14 | 2 | 28 | 20 |
| Example 10 | Toner 10 | 6 | 2 | 14 | 1 | 28 | 20 |
| Example 11 | Toner 11 | 7 | 2 | 14 | 1 | 28 | 20 |
| Example 12 | Toner 12 | 8 | 2 | 14 | 1 | 28 | 20 |
| Example 13 | Toner 13 | 9 | 2 | 14 | 1 | 28 | 20 |
| Example 14 | Toner 14 | 10 | 3.5 | 14 | 1 | 28 | 20 |
| Example 15 | Toner 15 | 11 | 2 | 14 | 1 | 28 | 20 |
| Example 16 | Toner 16 | 12 | 2 | 14 | 1 | 28 | 20 |
| Example 17 | Toner 17 | 13 | 1.6 | 14 | 1 | 28 | 20 |
| Example 18 | Toner 18 | 14 | 2 | 14 | 1 | 28 | 20 |
| Example 19 | Toner 19 | 1 | 2 | 14 | Styrene acrylate resin 1 | 28 | 20 |
| Example 20 | Toner 20 | 15 | 2 | 14 | 3 | 28 | 20 |
| Example 21 | Toner 21 | 16 | 2 | 14 | 4 | 28 | 20 |
| Example 22 | Toner 22 | 1 | 2 | 14 | 5 | 28 | 20 |
| Example 23 | Toner 23 | 1 | 2 | 14 | 6 | 28 | 20 |
| Example 24 | Toner 24 | 1 | 2 | 14 | 7 | 28 | 20 |
| Example 25 | Toner 25 | 1 | 2 | 14 | 8 | 28 | 20 |
| Example 26 | Toner 26 | 1 | 2 | 14 | 9 | 28 | 20 |
| Example 27 | Toner 27 | 1 | 2 | 14 | 10 | 28 | 20 |
| Example 28 | Toner 28 | 1 | 2 | 14 | 1 | 38 | 10 |
| Example 29 | Toner 29 | 1 | 2 | 14 | 1 | 18 | 30 |
| Example 30 | Toner 30 | 1 | 2 | 14 | 1 | 28 | 20 |
| Example 31 | Toner 31 | 1 | 2 | 14 | 1 | 28 | 20 |
| Example 32 | Toner 32 | 1 | 2 | 14 | 1 | 28 | 20 |
| Comparative example 1 | Toner 33 | 17 | 2 | 14 | 1 | 28 | 20 |
| Comparative example 2 | Toner 34 | 1 | 2 | 3 | 1 | 39 | 20 |
| Comparative example 3 | Toner 35 | 1 | 2 | 23 | 1 | 19 | 20 |

-continued

| | | | | | | | |
|---|---|---|---|---|---|---|---|
| Comparative example 4 | Toner 36 | 2 | 3 | 7 | 1 | 35 | 20 |
| Comparative example 5 | Toner 37 | 3 | 1.6 | 12 | 1 | 30 | 20 |
| Comparative example 6 | Toner 38 | 2 | 3 | 20 | 1 | 22 | 20 |
| Comparative example 7 | Toner 39 | 3 | 1.6 | 4 | 1 | 38 | 20 |

| | Initially charged dispersion liquid | | | | | Additional dispersion liquid Amorphous resin | |
|---|---|---|---|---|---|---|---|
| Example, Comparative example | Colorant Amount added (part) | Release agent Amount added (part) | Surfactant Amount added (part) | Coagulant Amount added (part) | Temperature at which coagulant is added Temperature (° C.) | Type (only in Example 19, styrene acrylate resin) | Amount added (part) |
| Example 1 | 6 | 8 | 0.7 | 20 | 20 | 1 | 24 |
| Example 2 | 6 | 8 | 0.7 | 20 | 20 | 1 | 24 |
| Example 3 | 6 | 8 | 0.7 | 20 | 20 | 1 | 24 |
| Example 4 | 6 | 8 | 0.7 | 20 | 20 | 1 | 24 |
| Example 5 | 6 | 8 | 0.7 | 20 | 20 | 1 | 24 |
| Example 6 | 6 | 8 | 0.7 | 20 | 20 | 1 | 24 |
| Example 7 | 6 | 8 | 0.7 | 20 | 20 | 1 | 24 |
| Example 8 | 6 | 8 | 1.0 | 22 | 20 | 1 | 24 |
| Example 9 | 6 | 8 | 0.7 | 20 | 15 | 2 | 24 |
| Example 10 | 6 | 8 | 0.7 | 20 | 20 | 1 | 24 |
| Example 11 | 6 | 8 | 0.7 | 20 | 20 | 1 | 24 |
| Example 12 | 6 | 8 | 0.7 | 20 | 20 | 1 | 24 |
| Example 13 | 6 | 8 | 0.7 | 20 | 20 | 1 | 24 |
| Example 14 | 6 | 8 | 0.7 | 18 | 20 | 1 | 24 |
| Example 15 | 6 | 8 | 0.7 | 22 | 20 | 1 | 24 |
| Example 16 | 6 | 8 | 0.9 | 20 | 20 | 1 | 24 |
| Example 17 | 6 | 8 | 0.6 | 20 | 20 | 1 | 24 |
| Example 18 | 6 | 8 | 0.7 | 20 | 20 | 1 | 24 |
| Example 19 | 6 | 8 | 0.8 | 20 | 20 | Styrene acrylate resin 1 | 24 |
| Example 20 | 6 | 8 | 0.7 | 20 | 15 | 3 | 24 |
| Example 21 | 6 | 8 | 0.7 | 20 | 25 | 4 | 24 |
| Example 22 | 6 | 8 | 0.7 | 17 | 20 | 5 | 24 |
| Example 23 | 6 | 8 | 0.7 | 23 | 20 | 6 | 24 |
| Example 24 | 6 | 8 | 0.7 | 19 | 20 | 7 | 24 |
| Example 25 | 6 | 8 | 0.7 | 21 | 20 | 8 | 24 |
| Example 26 | 6 | 8 | 0.7 | 20 | 20 | 9 | 24 |
| Example 27 | 6 | 8 | 0.7 | 20 | 20 | 10 | 24 |
| Example 28 | 6 | 8 | 0.7 | 20 | 20 | 1 | 24 |
| Example 29 | 6 | 8 | 0.7 | 20 | 20 | 1 | 24 |
| Example 30 | 6 | 8 | 0.7 | 20 | 20 | 1 | 24 |
| Example 31 | 6 | 8 | 0.7 | 20 | 20 | 1 | 24 |
| Example 32 | 6 | 8 | 0.7 | 20 | 20 | 1 | 24 |
| Comparative example 1 | 6 | 8 | 0.7 | 20 | 20 | 1 | 24 |
| Comparative example 2 | 6 | 8 | 0.7 | 20 | 20 | 1 | 24 |
| Comparative example 3 | 6 | 8 | 0.7 | 20 | 20 | 1 | 24 |
| Comparative example 4 | 6 | 8 | 0.7 | 20 | 20 | 1 | 24 |
| Comparative example 5 | 6 | 8 | 1.0 | 20 | 20 | 1 | 24 |
| Comparative example 6 | 6 | 8 | 0.7 | 20 | 20 | 1 | 24 |
| Comparative example 7 | 6 | 8 | 1.0 | 20 | 20 | 1 | 24 |

The following values of each of the toners prepared in Examples 1 to 32 and Comparative Examples 1 to 7 are determined. Tables 2 and 3 list the results. All of the above items are measured in accordance with the above-described methods or commonly used methods.

Items Related to Cross Section of Toner

- Area fraction of crosslinked resin particles (referred to as "Sc")
- Proportion of the voids in the cross section (referred to as "Se")
- Se/Sc Items Related to Crosslinked Resin Particles

- Glass transition temperature
- THF insoluble content
- Degree of swelling
- Mass proportion of unit derived from (meth)acrylate monomer having a carboxyl group (referred to as "COOH monomer")
- Average equivalent circle diameter of domain (referred to as "domain equivalent circle diameter")
- Average shape factor SF-1 of domain (referred to as "Domain SF-1")

Items Related to Amorphous Polyester Resin

- Glass transition temperature of amorphous polyester resin: T1
- T1 (Glass transition temperature of amorphous polyester resin)-T2 (Glass transition temperature of crosslinked resin particles)
- Acid value
- Acid value+Hydroxyl value
- Proportion of aliphatic dicarboxylic acid unit represented by Formula (1) (referred to as "proportion of unit represented by Formula (1)")

Others

- Proportion of crystalline resin in binder resin
- Particle size distribution index in number average particle size distribution of toner: GSD(p)
- Elements included in toner: elements selected from aluminum, molybdenum, and magnesium

TABLE 2

| Example, Comparative example | Toner cross section Sc (%) | Toner cross section Se (%) | Toner cross section Se/Sc | Crosslinked resin particles: Type of crosslinked resin particle dispersion liquid | Glass transition temperature (° C.) | THF insoluble content (%) | Degree of swelling | COOH monomer (%) | Domain equivalent circle diameter (nm) | Domain SF-1 |
|---|---|---|---|---|---|---|---|---|---|---|
| Example 1 | 23 | 5.5 | 0.24 | 1 | 12 | 98 | 5.5 | 0.1 | 160 | 112 |
| Example 2 | 6 | 2.5 | 0.42 | 1 | 12 | 98 | 5.5 | 0.1 | 160 | 112 |
| Example 3 | 39 | 3 | 0.08 | 1 | 12 | 98 | 5.5 | 0.1 | 160 | 112 |
| Example 4 | 17 | 1.3 | 0.08 | 2 | 12 | 97 | 6 | 0.05 | 165 | 114 |
| Example 5 | 28 | 9.5 | 0.34 | 3 | 12 | 98 | 5 | 0.3 | 170 | 116 |
| Example 6 | 34 | 2 | 0.06 | 2 | 12 | 97 | 6 | 0.1 | 165 | 114 |
| Example 7 | 6.5 | 9 | 1.38 | 3 | 12 | 98 | 5 | 0.1 | 170 | 116 |
| Example 8 | 23 | 7.5 | 0.33 | 4 | −1 | 98 | 6 | 0.1 | 170 | 120 |
| Example 9 | 23 | 4 | 0.17 | 5 | 31 | 97 | 4.5 | 0.1 | 160 | 114 |
| Example 10 | 23 | 7 | 0.30 | 6 | 11 | 89 | 9 | 0.1 | 175 | 127 |
| Example 11 | 23 | 5 | 0.22 | 7 | 13 | 99 | 1.8 | 0.1 | 150 | 114 |
| Example 12 | 23 | 6.5 | 0.28 | 8 | 11 | 92 | 10.5 | 0.1 | 180 | 125 |
| Example 13 | 23 | 5 | 0.22 | 9 | 12 | 98 | 3.5 | 0.1 | 160 | 113 |
| Example 14 | 23 | 4 | 0.17 | 10 | 12 | 98 | 5.5 | 0 | 160 | 112 |
| Example 15 | 23 | 8.5 | 0.37 | 11 | 12 | 98 | 5.5 | 0.55 | 160 | 113 |
| Example 16 | 23 | 4.5 | 0.20 | 12 | 12 | 98 | 5.5 | 0.1 | 45 | 110 |
| Example 17 | 23 | 6 | 0.26 | 13 | 12 | 98 | 5.5 | 0.1 | 310 | 126 |
| Example 18 | 23 | 3.5 | 0.15 | 14 | 11 | 93 | 8.5 | 0.1 | 220 | 131 |
| Example 19 | 23 | 2.5 | 0.11 | 1 | 12 | 98 | 5.5 | 0.1 | 160 | 112 |
| Example 20 | 23 | 4 | 0.17 | 15 | 27 | 98 | 5 | 0.1 | 170 | 115 |
| Example 21 | 23 | 6.5 | 0.28 | 16 | 3 | 98 | 6 | 0.1 | 170 | 113 |
| Example 22 | 23 | 3 | 0.13 | 1 | 12 | 98 | 5.5 | 0.1 | 160 | 112 |
| Example 23 | 23 | 8 | 0.35 | 1 | 12 | 98 | 5.5 | 0.1 | 160 | 112 |
| Example 24 | 23 | 2.5 | 0.11 | 1 | 12 | 98 | 5.5 | 0.1 | 160 | 112 |
| Example 25 | 23 | 8.5 | 0.37 | 1 | 12 | 98 | 5.5 | 0.1 | 160 | 112 |
| Example 26 | 23 | 7.5 | 0.33 | 1 | 12 | 98 | 5.5 | 0.1 | 160 | 112 |
| Example 27 | 23 | 3.5 | 0.15 | 1 | 12 | 98 | 5.5 | 0.1 | 160 | 112 |
| Example 28 | 23 | 5 | 0.22 | 1 | 12 | 98 | 5.5 | 0.1 | 160 | 112 |
| Example 29 | 23 | 4.5 | 0.20 | 1 | 12 | 98 | 5.5 | 0.1 | 160 | 112 |
| Example 30 | 23 | 5.5 | 0.24 | 1 | 12 | 98 | 5.5 | 0.1 | 160 | 112 |
| Example 31 | 23 | 5.5 | 0.24 | 1 | 12 | 98 | 5.5 | 0.1 | 160 | 112 |
| Example 32 | 23 | 5.5 | 0.24 | 1 | 12 | 98 | 5.5 | 0.1 | 160 | 112 |
| Comparative example 1 | 21 | 0.7 | 0.03 | 17 | −24 | 80 | 50 | 1.9 | 200 | 120 |
| Comparative example 2 | 4 | 4 | 1.00 | 1 | 12 | 98 | 5.5 | 0.1 | 160 | 112 |
| Comparative example 3 | 41 | 7.5 | 0.18 | 1 | 12 | 98 | 5.5 | 0.1 | 160 | 112 |
| Comparative example 4 | 12 | 0.8 | 0.07 | 2 | 12 | 97 | 6 | 0.05 | 165 | 114 |
| Comparative example 5 | 20 | 11 | 0.55 | 3 | 12 | 98 | 5 | 0.3 | 170 | 116 |
| Comparative example 6 | 36 | 1.5 | 0.04 | 2 | 12 | 97 | 6 | 0.05 | 165 | 114 |

TABLE 2-continued

| Example, Comparative example | Toner cross section Sc (%) | Se (%) | Se/Sc | Crosslinked resin particles: Type of crosslinked resin particle dispersion liquid | Glass transition temperature (° C.) | THF insoluble content (%) | Degree of swelling | COOH monomer (%) | Domain equivalent circle diameter (nm) | Domain SF-1 |
|---|---|---|---|---|---|---|---|---|---|---|
| Comparative example 7 | 5.5 | 8.5 | 1.55 | 3 | 12 | 98 | 5 | 0.3 | 170 | 116 |

TABLE 3

| Example, Comparative example | Amorphous polyester resin: Type of resin particle dispersion liquid | T1 (° C.) | T1 − T2 (° C.) | Acid value (mgKOH/g) | Acid value + hydroxyl value | Proportion of Formula (1) (mol %) | Binder resin: Proportion of crystalline resin (%) | Toner: Grain size distribution index GSD (p) | Element included | Evaluations: Gloss stability | Low temperature fixability |
|---|---|---|---|---|---|---|---|---|---|---|---|
| Example 1 | 1 | 61 | 49 | 10 | 27 | 17.7 | 28 | 1.25 | Al, Mo | A | A |
| Example 2 | 1 | 61 | 49 | 10 | 27 | 17.7 | 24 | 1.25 | Al, Mo | B | C |
| Example 3 | 1 | 61 | 49 | 10 | 27 | 17.7 | 31 | 1.25 | Al, Mo | C | B |
| Example 4 | 1 | 61 | 49 | 10 | 27 | 17.7 | 27 | 1.25 | Al, Mo | C | B |
| Example 5 | 1 | 61 | 49 | 10 | 27 | 17.7 | 29 | 1.25 | Al, Mo | B | C |
| Example 6 | 1 | 61 | 49 | 10 | 27 | 17.7 | 30 | 1.25 | Al, Mo | C | B |
| Example 7 | 1 | 61 | 49 | 10 | 27 | 17.7 | 24 | 1.25 | Al, Mo | B | C |
| Example 8 | 1 | 61 | 62 | 10 | 27 | 17.7 | 28 | 1.25 | Al, Mo | B | C |
| Example 9 | 2 | 66 | 35 | 11 | 23 | 6.3 | 28 | 1.24 | Al, Mo | B | C |
| Example 10 | 1 | 61 | 50 | 10 | 27 | 17.7 | 28 | 1.28 | Al, Mo | C | B |
| Example 11 | 1 | 61 | 48 | 10 | 27 | 17.7 | 28 | 1.25 | Al, Mo | B | C |
| Example 12 | 1 | 61 | 50 | 10 | 27 | 17.7 | 28 | 1.25 | Al, Mo | C | B |
| Example 13 | 1 | 61 | 49 | 10 | 27 | 17.7 | 28 | 1.25 | Al, Mo | B | C |
| Example 14 | 1 | 61 | 49 | 10 | 27 | 17.7 | 28 | 1.25 | Al, Mo | C | B |
| Example 15 | 1 | 61 | 49 | 10 | 27 | 17.7 | 28 | 1.25 | Al, Mo | C | B |
| Example 16 | 1 | 61 | 49 | 10 | 27 | 17.7 | 28 | 1.25 | Al, Mo | C | B |
| Example 17 | 1 | 61 | 49 | 10 | 27 | 17.7 | 28 | 1.25 | Al, Mo | C | B |
| Example 18 | 1 | 61 | 50 | 10 | 27 | 17.7 | 28 | 1.25 | Al, Mo | C | B |
| Example 19 | None | — | — | — | — | — | 28 | 1.24 | Al, Mo | C | C |
| Example 20 | 3 | 55 | 28 | 12 | 32 | 25.0 | 28 | 1.23 | Al, Mo | C | B |
| Example 21 | 4 | 74 | 71 | 9 | 24 | 2.0 | 28 | 1.27 | Al, Mo | C | B |
| Example 22 | 5 | 61 | 49 | 4.5 | 24 | 17.7 | 28 | 1.26 | Al, Mo | C | B |
| Example 23 | 6 | 61 | 49 | 21 | 32 | 17.7 | 28 | 1.29 | Al, Mo | C | B |
| Example 24 | 7 | 63 | 51 | 8 | 14 | 17.7 | 28 | 1.23 | Al, Mo | C | B |
| Example 25 | 8 | 58 | 46 | 15 | 41 | 17.7 | 28 | 1.28 | Al, Mo | C | B |
| Example 26 | 9 | 63 | 51 | 10 | 28 | 0.8 | 28 | 1.25 | Al, Mo | C | B |
| Example 27 | 10 | 57 | 45 | 11 | 26 | 30.7 | 28 | 1.25 | Al, Mo | C | B |
| Example 28 | 1 | 61 | 49 | 10 | 27 | 17.7 | 14 | 1.24 | Al, Mo | B | C |
| Example 29 | 1 | 61 | 49 | 10 | 27 | 17.7 | 42 | 1.3 | Al, Mo | C | A |
| Example 30 | 1 | 61 | 49 | 10 | 27 | 17.7 | 28 | 1.19 | Al, Mo | C | A |
| Example 31 | 1 | 61 | 49 | 10 | 27 | 17.7 | 28 | 1.36 | Al, Mo | C | A |
| Example 32 | 1 | 61 | 49 | 10 | 27 | 17.7 | 28 | 1.25 | None | C | A |
| Comparative example 1 | 1 | 61 | 49 | 10 | 27 | 17.7 | 28 | 1.25 | Al, Mo | D | D |
| Comparative example 2 | 1 | 61 | 49 | 10 | 27 | 17.7 | 24 | 1.25 | Al, Mo | C | D |
| Comparative example 3 | 1 | 61 | 49 | 10 | 27 | 17.7 | 32 | 1.25 | Al, Mo | D | C |
| Comparative example 4 | 1 | 61 | 49 | 10 | 27 | 17.7 | 25 | 1.25 | Al, Mo | D | B |
| Comparative example 5 | 1 | 61 | 49 | 10 | 27 | 17.7 | 27 | 1.25 | Al, Mo | C | D |
| Comparative example 6 | 1 | 61 | 49 | 10 | 27 | 17.7 | 30 | 1.25 | Al, Mo | D | C |
| Comparative example 7 | 1 | 61 | 49 | 10 | 27 | 17.7 | 24 | 1.25 | Al, Mo | C | D |

Evaluations

Stability of Image Gloss

A solid image (the amount of toner deposited on the sheet is adjusted to 8.0 $g/m^2$) is formed on coat paper sheets ("JD COAT 127" produced by FUJIFILM Business Innovation Corp.) using one of the developers prepared in Examples and Comparative Examples with a A3 color multifunction printer ("Apeos C3570" produced by FUJIFILM Business Innovation Corp.). The image is sandwiched between white paper sheets. Then, a weight is placed on the paper sheets such that the load applied to the image is 60 g/cm$^2$. The paper sheets and image are left to stand 60 days at temperature of 48° C. and a humidity of 60%. The glossiness of the image is measured before and after the image has been left to stand, and a change in glossiness is calculated.

The glossiness is measured with a micro-gloss meter 60° (produced by BYK-Gardner). The glossiness change is evaluated as described below. Table 3 lists the results.

A: The change in glossiness between before and after the image has been left to stand is less than 2% and is totally acceptable.

B: The change in glossiness between before and after the image has been left to stand is 2% or more and less than 5% and enough acceptable although a slight change is observed.

C: The change in glossiness between before and after the image has been left to stand is 5% or more and less than 10% and acceptable although a glossiness change is observed.

D: The change in glossiness between before and after the image has been left to stand is 10% or more and unacceptable.

Low Temperature Fixability of Image

A 50% halftone image is formed on waterproof white films (produced by FUJIFILM Business Innovation Corp.) using one of the developers prepared in Examples and Comparative Examples with a modification of a monochrome printer "Revoria Press E1136" (produced by FUJIFILM Business Innovation Corp.) at 10° C.

The level of fixation of the image is determined by a tape stripping method. The evaluation criteria are as described below. Table 2 lists the results.

A: Defects, such as missing image and white dots, are totally absent.

B: Some parts of the image are missed, but it is negligible and within an acceptable range.

C: Parts of the image are clearly missed, but it is within an acceptable range.

D: Missing parts and white dots are clearly present in the image, and it is at unacceptable level.

As described in Table 3, it is confirmed that the electrostatic image developing toners prepared in Examples have low temperature fixability and achieve stability of image gloss during high-pressure storage, compared with the electrostatic image developing toners prepared in Comparative Examples.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An electrostatic image developing toner comprising:
a binder resin; and
crosslinked resin particles, wherein, in a cross section of the electrostatic image developing toner, an area fraction Sc of the crosslinked resin particles is 5% or more and 40% or less, a proportion Se of voids in the cross section is 1% or more and 10% or less, and a ratio Se/Sc of the proportion Se of voids to the area fraction Sc is 0.05 or more and 1.5 or less.

(((2)))

The electrostatic image developing toner according to (((1))), wherein the crosslinked resin particles have a glass transition temperature Tg of 0° C. or more and 30° C. or less.

(((3)))

The electrostatic image developing toner according to (((1))) or (((2))), wherein a content of a component in the crosslinked resin particles, the component being insoluble in tetrahydrofuran, is 90% by mass or more, and when the crosslinked resin particles are immersed in tetrahydrofuran for 24 hours, a degree of swelling of the crosslinked resin particles is 2 or more and 10 or less.

(((4)))

The electrostatic image developing toner according to any one of (((1))) to (((3))), wherein the crosslinked resin particles include a styrene-(meth)acrylate copolymer.

(((5)))

The electrostatic image developing toner according to any one of (((1))) to (((4))), wherein the crosslinked resin particles includes units derived from a (meth)acrylate monomer, the unit being a unit derived from a monofunctional (meth)acrylate monomer and a unit derived from a difunctional (meth) acrylate monomer, and the unit derived from a monofunctional (meth)acrylate monomer includes a unit derived from a (meth)acrylate monomer that includes a carboxyl group and a unit derived from a (meth)acrylate monomer that does not include a carboxyl group.

(((6)))

The electrostatic image developing toner according to (((5))), wherein a mass proportion of the unit derived from a (meth)acrylate monomer that includes a carboxyl group in the crosslinked resin particles is 0.01% by mass or more and 0.50% by mass or less.

(((7)))

The electrostatic image developing toner according to any one of (((1))) to (((6))), wherein the binder resin includes an amorphous polyester resin.

(((8)))

The electrostatic image developing toner according to (((7))), wherein, when a glass transition temperature of the amorphous polyester resin is defined as T1(° C.) and a glass transition temperature of the crosslinked resin particles is defined as T2(° C.), $$30 \leq T1 - T2 \leq 70\ (°\ C.).$$

(((9)))

The electrostatic image developing toner according to (((7))) or (((8))), wherein the amorphous resin includes an amorphous polyester resin, and the crystalline resin includes a crystalline polyester resin.

(((10)))

The electrostatic image developing toner according to any one of (((7))) to (((9))), wherein a sum of an acid value (mgKOH/g) of the amorphous polyester resin and a hydroxyl value (mgKOH/g) of the amorphous polyester resin is 15 or more and 40 or less.

(((11)))

The electrostatic image developing toner according to any one of (((7))) to (((10))), wherein the amorphous polyester resin includes a unit derived from an aliphatic dicarboxylic acid represented by Formula (1), and a proportion of the unit derived from the aliphatic dicarboxylic acid to a unit derived from a dicarboxylic acid included in the entire amorphous polyester resin is 1 mol % or more and 30 mol % or less, $$—OC—(CH_2)_n—CO— \quad (1)$$

where n represents an integer of 4 to 12.

(((12)))

The electrostatic image developing toner according to any one of (((1))) to (((11))), wherein a content of a crystalline resin in the binder resin is 15% by mass or more and 40% by mass or less.

(((13)))

The electrostatic image developing toner according to any one of (((1))) to (((12))), wherein a domain formed by the crosslinked resin particles has an average equivalent circle diameter of 50 nm or more and 300 nm or less.

(((14)))

The electrostatic image developing toner according to any one of (((1))) to (((13))), wherein a domain formed by the crosslinked resin particles has an average shape factor SF-1 of 130 or less.

(((15)))

The electrostatic image developing toner according to any one of (((1))) to (((14))), wherein, in a number average particle size distribution of the electrostatic image developing toner, a grain size distribution index GSD(p) represented by Formula (2) is 1.20 or more and 1.35 or less, $$GSD(p) = 1 + (D50(p) - D16(p))/D50(p) \quad (2)$$

where D16(p) and D50(p) represent particle sizes at which cumulative numbers reach 16% and 50%, respectively. in a cumulative number particle size distribution curve.

(((16)))

The electrostatic image developing toner according to any one of (((1))) to (((15))), comprising:

one or more element selected from the group consisting of aluminum, molybdenum, and magnesium.

(((17)))

An electrostatic image developer comprising:

the electrostatic image developing toner according to any one of (((1))) to (((16))).

(((18)))

A toner cartridge detachably attachable to an image forming apparatus, the toner cartridge comprising:

the electrostatic image developing toner according to any one of (((1))) to (((16))).

(((19)))

A process cartridge detachably attachable to an image forming apparatus, the process cartridge comprising:

a developing unit that includes the electrostatic image developer according to (((17))) and develops an electrostatic image formed on a surface of an image holding member with the electrostatic image developer to form a toner image.

(((20)))

An image forming apparatus comprising:

an image holding member;

a charging unit that charges a surface of the image holding member;

an electrostatic image formation unit that forms an electrostatic image on the charged surface of the image holding member;

a developing unit that includes the electrostatic image developer according to (((17))) and develops the electrostatic image formed on the surface of the image holding member with the electrostatic image developer to form a toner image;

a transfer unit that transfers the toner image formed on the surface of the image holding member onto a surface of a recording medium; and a fixing unit that fixes the toner image transferred on the surface of the recording medium.

What is claimed is:

1. An electrostatic image developing toner comprising:

a binder resin; and crosslinked resin particles, wherein, in a cross section of the electrostatic image developing toner, an area fraction Sc of the crosslinked resin particles is 5% or more and 40% or less, a proportion Se of voids in the cross section is 1% or more and 10% or less, and a ratio Se/Sc of the proportion Se of voids to the area fraction Sc is 0.05 or more and 1.5 or less;

wherein the binder resin includes an amorphous polyester resin; and wherein, when a glass transition temperature of the amorphous polyester resin is defined as T1 (° C.) and a glass transition temperature of the crosslinked resin particles is defined as T2 (° C.), 30° C.≤T1−T2≤70° C.

2. The electrostatic image developing toner according to claim 1, wherein the crosslinked resin particles have a glass transition temperature Tg of 0° C. or more and 30° C. or less.

3. The electrostatic image developing toner according to claim 1, wherein a content of a component in the crosslinked resin particles, the component being insoluble in tetrahydrofuran, is 90% by mass or more, and when the crosslinked resin particles are immersed in tetrahydrofuran for 24 hours, a degree of swelling of the crosslinked resin particles is 2 or more and 10 or less.

4. The electrostatic image developing toner according to claim 1, wherein the crosslinked resin particles include a styrene-(meth)acrylate copolymer.

5. The electrostatic image developing toner according to claim 1, wherein the amorphous polyester resin has an acid value of 5 mgKOH/g or more and 20 mgKOH/g or less.

6. The electrostatic image developing toner according to claim 1, wherein a sum of an acid value (mgKOH/g) of the amorphous polyester resin and a hydroxyl value (mgKOH/g) of the amorphous polyester resin is 15 or more and 40 or less.

7. The electrostatic image developing toner according to claim 1, wherein the amorphous polyester resin includes a unit derived from an aliphatic dicarboxylic acid represented by Formula (1), and a proportion of the unit derived from the aliphatic dicarboxylic acid to a unit derived from a dicarboxylic acid included in the entire amorphous polyester resin is 1 mol % or more and 30 mol % or less, $$—OC—(CH_2)_n—CO— \quad (1)$$

where n represents an integer of 4 to 12.

8. The electrostatic image developing toner according to claim 1, wherein a content of a crystalline resin in the binder resin is 15% by mass or more and 40% by mass or less.

9. The electrostatic image developing toner according to claim 1, wherein a domain formed by the crosslinked resin particles has an average equivalent circle diameter of 50 nm or more and 300 nm or less.

10. The electrostatic image developing toner according to claim 1, wherein a domain formed by the crosslinked resin particles has an average shape factor SF-1 of 130 or less.

11. The electrostatic image developing toner according to claim 1, wherein, in a number average particle size distribution of the electrostatic image developing toner, a grain size distribution index GSD(p) represented by Formula (2) is 1.20 or more and 1.35 or less, $$GSD(p)=1+(D50(p)-D16(p))/D50(p) \quad (2)$$

where D16(p) and D50(p) represent particle sizes at which cumulative numbers reach 16% and 50%, respectively, in a cumulative number particle size distribution curve.

12. The electrostatic image developing toner according to claim 1, comprising:

one or more element selected from the group consisting of aluminum, molybdenum, and magnesium.

13. An electrostatic image developer comprising:

the electrostatic image developing toner according to claim 1.

14. A toner cartridge detachably attachable to an image forming apparatus, the toner cartridge comprising:

the electrostatic image developing toner according to claim 1.

15. A process cartridge detachably attachable to an image forming apparatus, the process cartridge comprising:

a developing unit that includes the electrostatic image developer according to claim 13 and develops an electrostatic image formed on a surface of an image holding member with the electrostatic image developer to form a toner image.

16. An image forming apparatus comprising:

an image holding member;

a charging unit that charges a surface of the image holding member;

an electrostatic image formation unit that forms an electrostatic image on the charged surface of the image holding member;

a developing unit that includes the electrostatic image developer according to claim 13 and develops the electrostatic image formed on the surface of the image holding member with the electrostatic image developer to form a toner image;

a transfer unit that transfers the toner image formed on the surface of the image holding member onto a surface of a recording medium; and a fixing unit that fixes the toner image transferred on the surface of the recording medium.

17. An electrostatic image developing toner comprising:

a binder resin; and crosslinked resin particles, wherein, in a cross section of the electrostatic image developing toner, an area fraction Sc of the crosslinked resin particles is 5% or more and 40% or less, a proportion Se of voids in the cross section is 1% or more and 10% or less, and a ratio Se/Sc of the proportion Se of voids to the area fraction Sc is 0.05 or more and 1.5 or less;

wherein the crosslinked resin particles include units derived from a (meth)acrylate monomer, the units being a unit derived from a monofunctional (meth) acrylate monomer and a unit derived from a difunctional (meth)acrylate monomer; and wherein the unit derived from a monofunctional (meth) acrylate monomer includes a unit derived from a (meth) acrylate monomer that includes a carboxyl group and a unit derived from a (meth)acrylate monomer that does not include a carboxyl group.

18. The electrostatic image developing toner according to claim 17, wherein a mass proportion of the unit derived from a (meth)acrylate monomer that includes a carboxyl group in the crosslinked resin particles is 0.01% by mass or more and 0.50% by mass or less.

* * * * *